US011329477B2

(12) United States Patent
Yamane et al.

(10) Patent No.: US 11,329,477 B2
(45) Date of Patent: May 10, 2022

(54) DIRECT-CURRENT VOLTAGE SUPPLY CIRCUIT

(71) Applicant: Murata Manufacturing Co., Ltd., Nagaokakyo (JP)

(72) Inventors: Rie Yamane, Nagaokakyo (JP); Tadashi Kato, Nagaokakyo (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 288 days.

(21) Appl. No.: 16/736,844

(22) Filed: Jan. 8, 2020

(65) Prior Publication Data
US 2020/0144808 A1 May 7, 2020

Related U.S. Application Data

(63) Continuation of application No. PCT/JP2017/031109, filed on Aug. 30, 2017.

(30) Foreign Application Priority Data

Jul. 28, 2017 (JP) .............................. JP2017-147118
Aug. 7, 2017 (JP) .............................. JP2017-152377

(51) Int. Cl.
H02H 5/04 (2006.01)
(52) U.S. Cl.
CPC .................................. H02H 5/042 (2013.01)
(58) Field of Classification Search
CPC .............................................. H02H 5/04–042
See application file for complete search history.

(56) References Cited

U.S. PATENT DOCUMENTS 5,239,331 A    8/1993  Kobe et al.
5,552,999 A *  9/1996  Polgreen ................. G06F 1/206
                                                    702/63
(Continued)

FOREIGN PATENT DOCUMENTS

CN    106602511 A  *  4/2017
JP    62-230379 A     10/1987
(Continued)

OTHER PUBLICATIONS

Official Communication issued in International Patent Application No. PCT/JP2017/031109, dated Nov. 21, 2017.

Primary Examiner — Jared Fureman
Assistant Examiner — Christopher J Clark
(74) Attorney, Agent, or Firm — Keating & Bennett, LLP

(57) ABSTRACT

A direct-current voltage supply circuit includes a first field effect transistor in a power line, a voltage divider including a first fixed resistor and a positive temperature coefficient thermistor between the power line and a ground line, a thyristor connected at an anode thereof to the power line, with a second field effect transistor interposed therebetween, connected at a gate thereof to a node in the voltage divider, and connected at a cathode thereof to the ground line, with a second fixed resistor interposed therebetween, and a third fixed resistor connected in parallel with the thyristor and the second field effect transistor. If abnormal heating increases the resistance of the positive temperature coefficient thermistor, the first field effect transistor is turned off and the supply of direct-current voltage is stopped.

18 Claims, 18 Drawing Sheets

(56) References Cited

U.S. PATENT DOCUMENTS

| | | | | |
|---|---|---|---|---|
| 6,072,681 | A | * | 6/2000 | Cogan .................... H02H 5/042 |
| | | | | 361/100 |
| 6,205,010 | B1 | * | 3/2001 | Ohsaka .............. H03K 17/0822 |
| | | | | 361/103 |
| 2016/0006190 | A1 | | 1/2016 | Katsuura et al. |
| 2018/0294637 | A1 | * | 10/2018 | Cass ...................... G01K 3/005 |
| 2019/0097416 | A1 | * | 3/2019 | Schmalz .................. G01K 7/24 |

FOREIGN PATENT DOCUMENTS

| | | |
|---|---|---|
| JP | 04-268647 A | 9/1992 |
| JP | 05-260647 A | 10/1993 |
| JP | 06-3648 A | 1/1994 |
| JP | 10-145205 A | 5/1998 |
| JP | 2001-195140 A | 7/2001 |
| WO | 00/08733 A1 | 2/2000 |
| WO | 2015/059863 A1 | 4/2015 |

\* cited by examiner

DIRECT-CURRENT VOLTAGE SUPPLY CIRCUIT

CROSS REFERENCE TO RELATED APPLICATIONS

This application claims the benefit of priority to Japanese Patent Application No. 2017-147118 filed on Jul. 28, 2017 and Japanese Patent Application No. 2017-152377 filed on Aug. 7, 2017, and is a Continuation Application of PCT Application No. PCT/JP2017/031109 filed on Aug. 30, 2017. The entire contents of each application are hereby incorporated herein by reference.

BACKGROUND OF THE INVENTION

1. Field of the Invention

The present invention relates to a direct-current voltage supply circuit that supplies a direct-current voltage from a direct-current power source to a load. More specifically, the present invention relates to a direct-current voltage supply circuit having a safer protective function against abnormal heating.

2. Description of the Related Art

If overcurrent or abnormal heating occurs in a direct-current voltage supply circuit that supplies a direct-current voltage from a direct-current power source to a load, it is important to stop the supply of voltage to the load to prevent further damage to the load and the direct-current voltage supply circuit.

Japanese Unexamined Patent Application Publication No. 5-260647 discloses a direct-current voltage supply circuit having such a function.

FIG. 21 illustrates a direct-current voltage supply circuit (current cutoff device) 1100 disclosed in Japanese Unexamined Patent Application Publication No. 5-260647.

The direct-current voltage supply circuit 1100 includes a direct-current power source 101. The direct-current power source 101 supplies a direct-current voltage through a power line 102 and a ground line 103 to a load (load-side substrate) 104.

A positive temperature coefficient thermistor 105 is disposed in the power line 102 of the direct-current voltage supply circuit 1100.

If overcurrent or abnormal heating occurs in the direct-current voltage supply circuit 1100, the positive temperature coefficient thermistor 105 increases in resistance and stops the supply of direct-current voltage from the direct-current power source 101 to the load 104.

The direct-current voltage supply circuit 1100 disclosed in Japanese Unexamined Patent Application Publication No. 5-260647 has a problem in that when the positive temperature coefficient thermistor 105 naturally cools down after the supply of power from the direct-current power source 101 to the load 104 is stopped, the positive temperature coefficient thermistor 105 decreases in resistance and allows automatic resumption of the supply of direct-current voltage from the direct-current power source 101 to the load 104.

After the supply of direct-current voltage from the direct-current power source 101 to the load 104 is stopped, the cause of the overcurrent or abnormal heating, such as a short circuit, may be resolved. However, if the supply of direct-current voltage is resumed before such a cause as short circuit is resolved, overcurrent or abnormal heating occurs again. If the supply of direct-current voltage fails to stop again in response to another occurrence of overcurrent or abnormal heating, the load or the direct-current voltage supply circuit may be further damaged.

SUMMARY OF THE INVENTION

Preferred embodiments of the present invention provide direct-current voltage supply circuits that each significantly reduce or prevent abnormal heating.

A direct-current voltage supply circuit according to a preferred embodiment of the present invention includes a power line and a ground line between a direct-current power source and a load, and further includes a state holding circuit capable of taking either a first state or a second state; a power source connecting circuit disposed in at least one of the power line and the ground line, the power source connecting circuit being in a connected state when the state holding circuit is in the first state and in a cutoff state when the state holding circuit is in the second state; a temperature detector to detect abnormal heating and bring the state holding circuit into the second state; and a reset circuit to bring the state holding circuit into the first state.

In a direct-current voltage supply circuit according to a preferred embodiment of the present invention configured as described above, even when the temperature detector naturally cools down after the power source connecting circuit goes into the cutoff state, the supply of direct-current voltage is not automatically resumed until the reset circuit brings the state holding circuit into the first state, as long as the state holding circuit holds the second state.

Preferably, the power source connecting circuit includes a first switch disposed in the power line; the temperature detector includes a voltage divider inserted between a portion of the power line adjacent to the direct-current power source and the ground line, the voltage divider including a first resistor and a thermistor connected in series; the state holding circuit includes a thyristor connected at a gate thereof to a node between the first resistor and the thermistor of the voltage divider, and connected at a cathode thereof to a control electrode of the first switch; the power source connecting circuit further includes a second resistor connected between the control electrode of the first switch and the ground line; and the reset circuit includes a second switch connected between the power line and an anode of the thyristor, the second switch to receive at a control electrode thereof a signal varying in accordance with a voltage at a power terminal connected to the load. With this configuration, in response to a temperature rise detected by the thermistor, the first switch is turned off, the supply of direct-current voltage through the power line is stopped, and the second switch and the thyristor are both turned on, so that the supply of direct-current voltage through the power line remains stopped.

Preferably, the first switch and the second switch each are either a field effect transistor or a bipolar transistor.

The direct-current voltage supply circuit may be configured such that by isolating the load from a portion of the power line adjacent to the load, the second switch and the first switch are turned off and on, respectively, and the supply of direct-current voltage through the power line is resumed. In this case, after the supply of direct-current voltage through the power line is stopped, the load is isolated from the direct-current voltage supply circuit to examine the cause of abnormal heating. Then, after the cause of the abnormal heating is removed or eliminated, or after the load is replaced with a normal one, the load is connected to the direct-current voltage supply circuit again. The supply of direct-current voltage can thus be safely resumed.

The thyristor may include a PNP transistor and an NPN transistor. The thyristor may be configured such that a collector of the PNP transistor is connected to a base of the NPN transistor, a base of the PNP transistor is connected to a collector of the NPN transistor, an emitter of the PNP transistor corresponds to the anode of the thyristor, a node between the collector of the PNP transistor and the base of the NPN transistor corresponds to the gate of the thyristor, and an emitter of the NPN transistor corresponds to the collector of the thyristor. That is, the thyristor does not necessarily need to be a single electronic component, and may include a plurality of transistors.

The direct-current voltage supply circuit may be configured such that the thermistor is a positive temperature coefficient thermistor, an end portion of the voltage divider adjacent to the first resistor is connected to the power line, and an end portion of the voltage divider adjacent to the positive temperature coefficient thermistor is connected to the ground line. In this case, if abnormal heating increases the temperature and resistance of the positive temperature coefficient thermistor, a voltage at the node between the first resistor and the positive temperature coefficient thermistor of the voltage divider increases and the first switch turns off.

The direct-current voltage supply circuit may be configured such that the thermistor is a negative temperature coefficient thermistor, an end portion of the voltage divider adjacent to the negative temperature coefficient thermistor is connected to the power line, and an end portion of the voltage divider adjacent to the first resistor is connected to the ground line. In this case, if abnormal heating increases the temperature of the negative temperature coefficient thermistor and decreases the resistance of the negative temperature coefficient thermistor, a voltage at the node between the negative temperature coefficient thermistor and the first resistor of the voltage divider increases and the first switch turns off.

It is also preferable that the direct-current voltage supply circuit includes at least one of a first capacitor connected in parallel with the thermistor of the voltage divider, a second capacitor connected in parallel with the second resistor, a third capacitor connected between the portion of the power line adjacent to the direct-current power source and the ground line, a sixth resistor connected between the portion of the power line adjacent to the direct-current power source and the base of the PNP transistor, and a seventh resistor connected between the control electrode of the first switch and the cathode of the thyristor.

By adding the first capacitor, the supply of direct-current voltage from the direct-current power source to the load is prevented from being stopped by a malfunction caused by noise. Adding the second capacitor prevents noise from causing the first switch to malfunction. Adding the third capacitor prevents a malfunction caused by noise. By adding the sixth resistor, the supply of direct-current voltage from the direct-current power source to the load is reliably stopped in the event of abnormal heating. Adding the seventh resistor prevents noise from causing the first switch to malfunction.

The power line can be divided at a given point between the first switch and the load, and the ground line can be divided at a given point between a node where the second resistor connects to the ground line and the load. The power line and the ground line each divided may be connected by a pair of connectors, and the thermistor may monitor abnormal heating near the connectors. In this case, the thermistor is able to detect abnormal heating caused, for example, by foreign matter caught in a node between the connectors, and is able to stop the supply of direct-current voltage through the power line. The connectors used here may be, for example, USB connectors.

Preferably, the temperature detector may include a first resistor and a thermistor connected in series between a portion of the power line adjacent to the direct-current power source and the ground line, a second resistor and a third resistor connected in series between the part of the power line adjacent to the direct-current power source and the ground line, and a comparator to compare a voltage at a node between the first resistor and the thermistor and a voltage at a node between the second resistor and the third resistor.

Preferably, the temperature detector may include a first current source and a thermistor connected in series between a portion of the power line adjacent to the direct-current power source and the ground line, a second current source and a reference resistor connected in series between the portion of the power line adjacent to the direct-current power source and the ground line, and a comparator to compare a voltage at a node between the first current source and the thermistor and a voltage at a node between the second current source and the reference resistor.

Preferably, the state holding circuit may include a flip-flop circuit to receive at a clock terminal thereof an output of the temperature detector, connected at a D input terminal thereof to a portion of the power line adjacent to the direct-current power source, and reset in response to an output of the reset circuit.

Preferably, the state holding circuit may include an SR latch circuit set to the second state in response to an output of the temperature detector, and reset to the first state in response to an output of the reset circuit.

In the direct-current voltage supply circuits of preferred embodiments of the present invention, even when, after abnormal heating is detected and the supply of direct-current voltage through the power line is stopped, the temperature detector naturally cools down and decreases in temperature, since the state holding circuit holds the second state and the power source connecting circuit remains off, the supply of direct-current voltage is not automatically resumed. It is thus possible to prevent a failure in stopping the supply of direct-current voltage again, and thus to reduce or prevent further damage to the load or to the direct-current voltage supply circuit.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
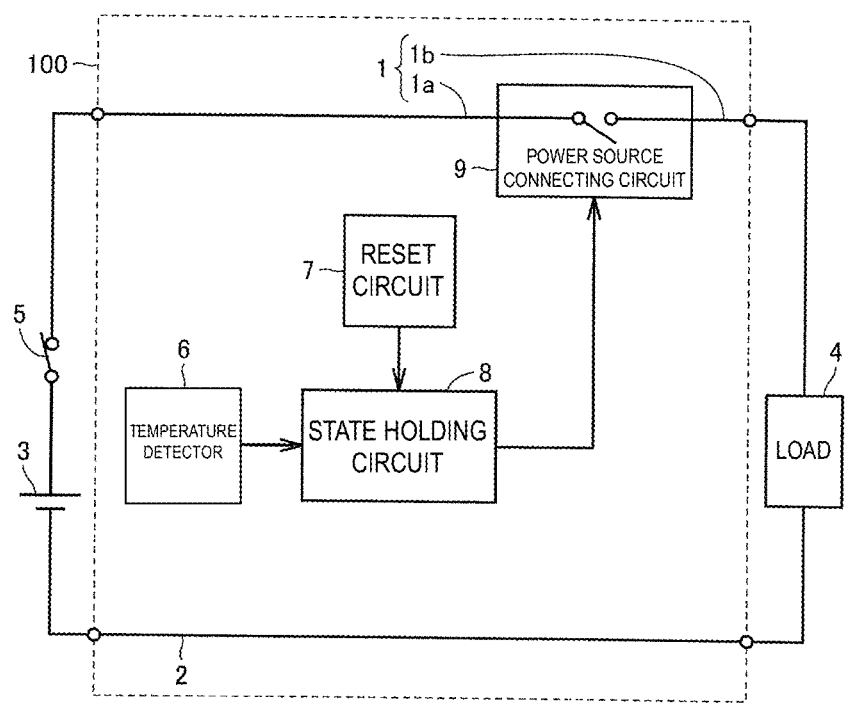
FIG. 1 is a functional block diagram of a direct-current voltage supply circuit 100 according to a first preferred embodiment of the present invention.

Preferred embodiments of the present invention will be described in detail with reference to the drawings. The same or equivalent portions and elements in the drawings are denoted by the same reference numerals and their explanation will not be repeated.

The preferred embodiments described herein are merely exemplary preferred embodiments of the present invention, and the present invention is not limited to the preferred embodiments described herein. Techniques described in different preferred embodiments may be carried out in a combined manner, and such combinations are also included in the present invention. The drawings are provided to help understand the preferred embodiments, and may not necessarily be drawn exactly to scale. For example, the ratios of dimensions of, or between, elements depicted in the drawings may differ from the ratios of dimensions described in the description. Also, the elements described in the description may be omitted or reduced in number in the drawings.

First Preferred Embodiment

FIG. 1 is a functional block diagram of a direct-current voltage supply circuit 100 according to a first preferred embodiment of the present invention. Referring to FIG. 1, the direct-current voltage supply circuit 100 includes a power line 1 and a ground line 2, a state holding circuit 8, a power source connecting circuit 9, a temperature detector 6, and a reset circuit 7. The power line 1 includes a power switch 5, which is optional.

The power line 1 and the ground line 2 are inserted between a direct-current power source 3 and a load 4. The state holding circuit 8 is capable of being in either a first state or a second state.

The power source connecting circuit 9 is disposed in at least one of the power line 1 and the ground line 2. Although FIG. 1 illustrates an example where the power source connecting circuit 9 is disposed in the power line 1, the power source connecting circuit 9 may be disposed in the ground line 2 instead of the power line 1, or may be disposed in each of the power line 1 and the ground line 2. The power source connecting circuit 9 is in a connected state when the state holding circuit 8 is in the first state, and the power source connecting circuit 9 is in a cutoff state when the state holding circuit 8 is in the second state.

The temperature detector 6 detects abnormal heating and sets the state holding circuit 8 to the second state. Upon detecting abnormal heating, the temperature detector 6 changes the state of the state holding circuit 8 to cut off the power source connecting circuit 9. The reset circuit 7 resets the state holding circuit 8 to the first state. When the cause of abnormal heating is removed or eliminated, the reset circuit 7 changes the state of the state holding circuit 8 to resume the connection of the power source connecting circuit 9.

Figure 2:
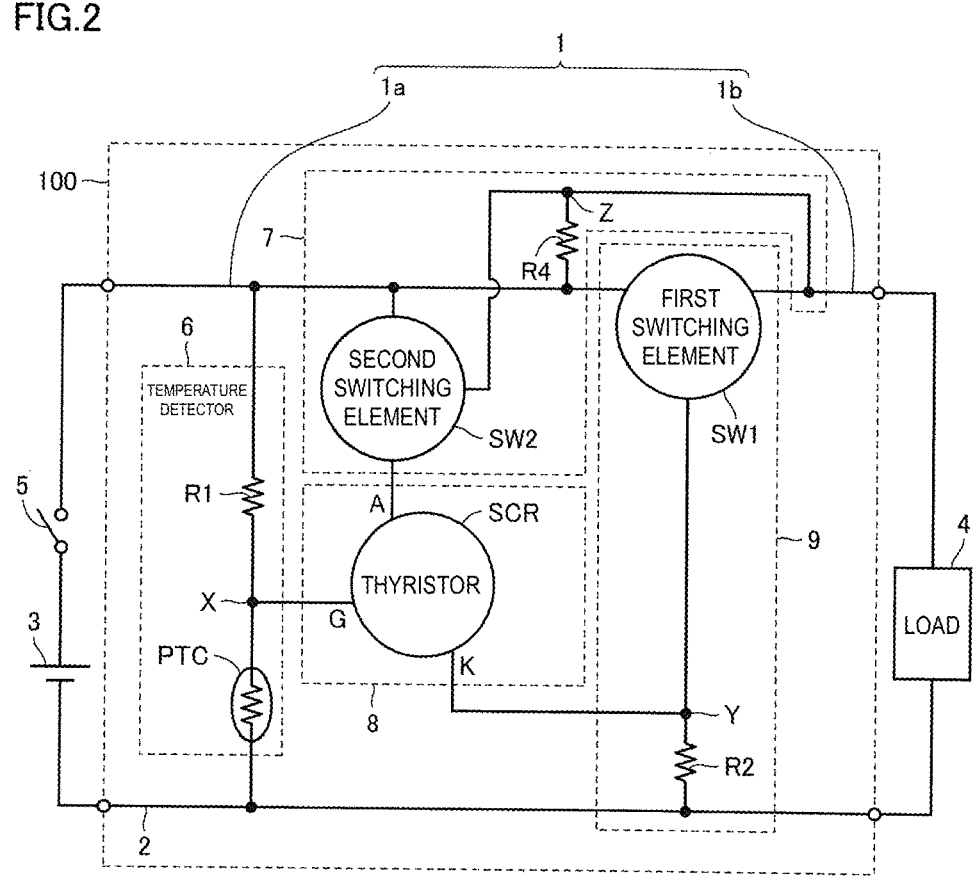
FIG. 2 is a diagram illustrating an exemplary circuit configuration of the direct-current voltage supply circuit 100.

FIG. 2 is a diagram illustrating an exemplary circuit configuration of the direct-current voltage supply circuit 100. The power source connecting circuit 9 includes a first switch SW1 and a resistor R2. The first switch SW1 is disposed in the power line 1. The resistor R2 is connected between a control electrode of the first switch SW1 and the ground line 2.

The temperature detector 6 includes a first fixed resistor R1 and a positive temperature coefficient thermistor PTC that are connected in series between a power line 1a adjacent to the direct-current power source 3 and the ground line 2. The first fixed resistor R1 is connected at one end thereof to the power line 1 and connected at the other end thereof to a node X. The positive temperature coefficient thermistor PTC is connected at one end thereof to the ground line 2 and connected at the other end thereof to the node X. The positive temperature coefficient thermistor PTC monitors abnormal heating. In the direct-current voltage supply circuit 100, the positive temperature coefficient thermistor PTC is disposed at a predetermined position where abnormal heating is to be monitored.

The direct-current voltage supply circuit 100 includes a thyristor SCR. A gate G of the thyristor SCR is connected to the node X between the first fixed resistor R1 and the positive temperature coefficient thermistor PTC of the temperature detector 6. A cathode K of the thyristor SCR is connected to a node Y.

An anode A of the thyristor SCR is connected to the reset circuit 7. The reset circuit 7 includes a second switch SW2 and a resistor R4. The second switch SW2 is connected between the power line 1a adjacent to the direct-current power source 3 and the anode A of the thyristor SCR. A control electrode of the second switch SW2 is connected to a node Z. The resistor R4 is connected between the node Z and the power line 1a adjacent to the direct-current power source 3. The node Z is also connected to a power line 1b adjacent to the load 4.

The operation of the direct-current voltage supply circuit illustrated in FIG. 2 will now be described.

The voltages at the nodes X and Y are set such that during normal operation, the first switch SW1 is on (conducting) and the second switch SW2 is off (non-conducting). This enables the supply of direct-current voltage from the direct-current power source 3 to the load 4.

The flow of current between the anode A and the cathode K of the thyristor SCR depends on the state of the second switch SW2 and the voltage at the node X. That is, the current between the anode A and the cathode K of the thyristor SCR can flow when the second switch SW2 is on, and does not flow when the second switch SW2 is off. During normal operation, where the second switch SW2 is off, no current flows between the anode A and the cathode K of the thyristor.

However, if abnormal heating caused, for example, by a short circuit occurs on the load side, the temperature of the positive temperature coefficient thermistor PTC increases rapidly and the resistance of the positive temperature coefficient thermistor PTC also increases. As the resistance of the positive temperature coefficient thermistor PTC increases, the voltage at the node X increases. As the voltage at the node X increases, the potential at the node Y also increases through the gate G and the cathode K of the thyristor SCR.

The first switch SW1 is thus turned off (or brought out of conduction). This stops the supply of direct-current voltage from the direct-current power source 3 to the load 4.

While the supply of direct-current voltage remains stopped, the second switch SW2 is turned on when the potential of the power line 1b adjacent to the load 4 reaches (or becomes close to) a short-circuit potential. This allows current to flow between the anode A and the cathode K of the thyristor SCR.

The second switch SW2 remains on as long as the power line 1b adjacent to the load 4 is at the short-circuit potential. This allows the first switch SW1 to remain off, and thus allows the supply of direct-current voltage to remain stopped.

When the load 4 is isolated from the direct-current voltage supply circuit 100, the direct-current voltage supply circuit 100 opens at the end of the power line 1b adjacent to the load 4. The resistor R4 thus brings the voltage at the node Z to a source voltage. The second switch SW2 is turned off and no current flows between the anode A and the cathode K of the thyristor SCR.

Then, after the cause of the abnormal heating is removed or eliminated, or after the load 4 is replaced with a normal one, the load 4 is connected to the direct-current voltage supply circuit 100 again. This enables the direct-current voltage supply circuit 100 to return to the normal operating state.

Figure 3:
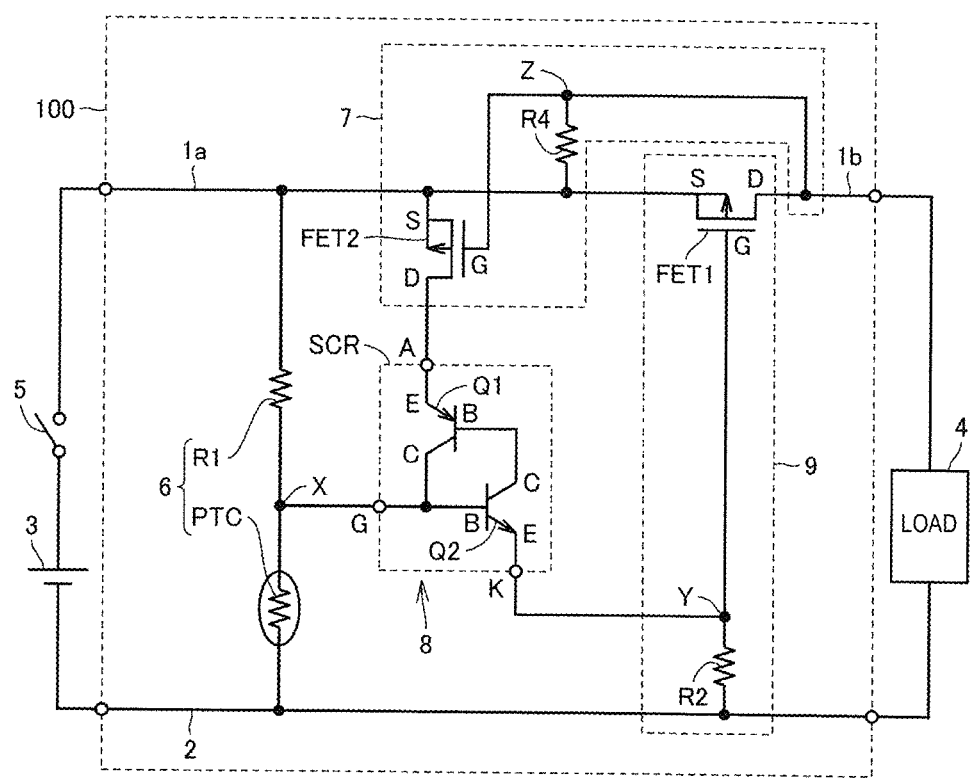
FIG. 3 illustrates an exemplary circuit where a thyristor includes transistors, and first and second switches are both field effect transistors.

FIG. 3 illustrates an exemplary circuit where the thyristor includes transistors, and the first and second switches are preferably both field effect transistors, for example. In the configuration illustrated in FIG. 3, the power source connecting circuit 9 includes a first field effect transistor FET1 as the first switch SW1. The reset circuit 7 includes a second field effect transistor FET2 as the second switch SW2. The state holding circuit 8 includes a PNP transistor Q1 and an NPN transistor Q2 as the thyristor SCR.

Figure 4:
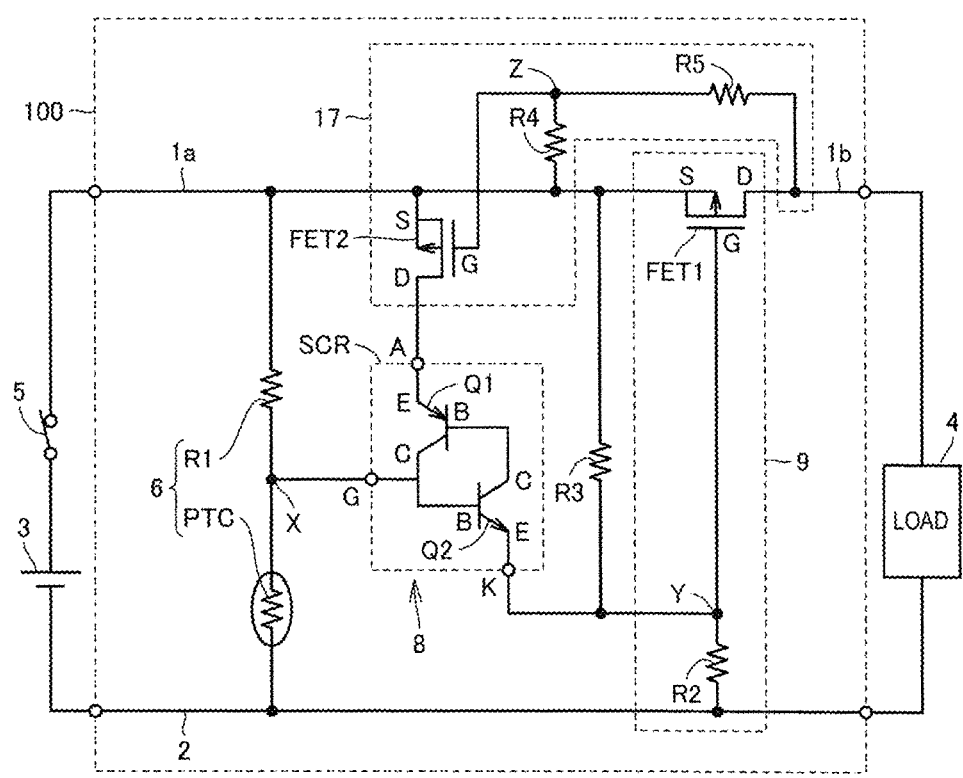
FIG. 4 illustrates an exemplary modification of the circuit illustrated in FIG. 3.

FIG. 4 illustrates an exemplary modification of the circuit illustrated in FIG. 3. In the configuration illustrated in FIG. 4, the direct-current voltage supply circuit 100 includes a reset circuit 17, instead of the reset circuit 7, and further includes a fixed resistor R3. The reset circuit 17 includes a resistor R5 connected between the node Z and the power line 1b adjacent to the load 4. The resistor R3 is connected between the power line 1a adjacent to the direct-current power source 3 and the node Y. By adding the resistors R3 and R5 with appropriate resistances, voltages at the nodes Y and Z can be regulated. Since basic configurations and operations illustrated in FIGS. 2, 3, and 4 have common features, the details will be described using FIG. 4.

FIG. 4 is an equivalent circuit diagram of the direct-current voltage supply circuit 100 according to the first preferred embodiment.

The direct-current voltage supply circuit 100 includes the power line 1 and the ground line 2. The power line 1 and the ground line 2 are each connected at one end thereof to the direct-current power source 3 and connected at the other end thereof to the load 4.

The power line 1 includes the power switch 5, which is optional.

The first field effect transistor FET1 is disposed in the power line 1. More specifically, a source S of the first field effect transistor FET1 is connected to the power line 1a adjacent to the direct-current power source 3, and a drain D of the first field effect transistor FET1 is connected to the power line 1b adjacent to the load 4.

The temperature detector 6 is connected between the power line 1a adjacent to the direct-current power source 3 and the ground line 2. The temperature detector 6 includes the first fixed resistor R1 and the positive temperature coefficient thermistor PTC that are connected in series, with the node X therebetween. The temperature detector 6 is connected to the power line 1 on one side thereof adjacent to the first fixed resistor R1. The temperature detector 6 is connected to the ground line 2 on the other side thereof adjacent to the positive temperature coefficient thermistor PTC. The positive temperature coefficient thermistor PTC monitors abnormal heating. In the direct-current voltage supply circuit 100, the positive temperature coefficient thermistor PTC is disposed at a predetermined position where abnormal heating is to be monitored.

The direct-current voltage supply circuit 100 includes the PNP transistor Q1 and the NPN transistor Q2. A collector C of the PNP transistor Q1 is connected to a base B of the NPN transistor Q2, and a base B of the PNP transistor Q1 is connected to a collector C of the NPN transistor Q2. The PNP transistor Q1 and the NPN transistor Q2 function as the thyristor SCR.

That is, an emitter E of the PNP transistor Q1 corresponds to the anode A of the thyristor SCR. A node between the collector C of the PNP transistor Q1 and the base B of the NPN transistor Q2 corresponds to the gate G of the thyristor SCR. An emitter E of the NPN transistor Q2 corresponds to the cathode K of the thyristor SCR. In the present preferred embodiment, the combined member of the PNP transistor Q1 and the NPN transistor Q2 connected as described above will also be referred to as the thyristor SCR.

The anode A of the thyristor SCR is connected through the second field effect transistor FET2 to the power line 1a adjacent to the direct-current power source 3. The gate G of the thyristor SCR is connected to the node X between the first fixed resistor R1 and the positive temperature coefficient thermistor PTC of the temperature detector 6. The cathode K of the thyristor SCR is connected through the second fixed resistor R2 to the ground line 2. The thyristor SCR (cathode K) and the second fixed resistor R2 are connected in series, with the node Y therebetween. The third fixed resistor R3 is connected between the power line 1a adjacent to the direct-current power source 3 and the node Y.

The cathode K of the thyristor SCR and a node between the second fixed resistor R2 and the third fixed resistor R3, or the node Y, are connected to the gate G of the first field effect transistor FET1.

The second field effect transistor FET2 is connected between the power line 1a adjacent to the direct-current power source 3 and the anode A of the thyristor SCR. More specifically, the source S of the second field effect transistor FET2 is connected to the power line 1a adjacent to the direct-current power source 3, and the drain D of the second field effect transistor FET2 is connected to the anode A of the thyristor SCR (or to the emitter E of the PNP transistor Q1).

The fourth fixed resistor R4 and the fifth fixed resistor R5 are connected between, and in parallel with, the source S and the drain D of the first field effect transistor FET1. The fourth fixed resistor R4 and the fifth fixed resistor R5 are connected in series, with the node Z therebetween. The node Z is connected to the gate G of the second field effect transistor FET2.

The direct-current voltage supply circuit 100 configured as described above operates in the following manner.

When the power switch 5 of the direct-current voltage supply circuit 100 is turned on, a direct-current voltage is supplied from the direct-current power source 3 to the load 4. Settings are configured such that when direct-current voltage is properly supplied to the load 4 (in the normal operating state), the first field effect transistor FET1 is on and the second field effect transistor FET2 is off. This enables the supply of direct-current voltage from the direct-current power source 3 to the load 4.

The first field effect transistor FET1 is switched on and off by a voltage at the node Y, or a voltage at the gate G of the first field effect transistor FET1, determined by a voltage divider including the third fixed resistor R3 and the second fixed resistor R2. When a direct-current voltage is properly supplied to the load 4, the voltage at the gate G of the first field effect transistor FET1 is set lower than a predetermined value. As a result, since a voltage between the gate G and the source S of the first field effect transistor FET1 exceeds its threshold, the first field effect transistor FET1 is turned on.

The second field effect transistor FET2 is switched on and off by a voltage at the node Z, or a voltage at the gate G of the second field effect transistor FET2, determined by a voltage divider including the fourth fixed resistor R4 and the fifth fixed resistor R5. When a direct-current voltage is properly supplied to the load 4, the voltage at the gate G of the second field effect transistor FET2 is set higher than a predetermined value. As a result, since a voltage between the gate G and the source S of the second field effect transistor FET2 does not exceed its threshold, the second field effect transistor FET2 is turned off.

The thyristor SCR is switched on and off by a voltage at the node X of the temperature detector 6, or a voltage at the gate G of the thyristor SCR, determined by the resistance of the first fixed resistor R1 and the resistance of the positive temperature coefficient thermistor PTC. The thyristor SCR is configured such that the voltage at the gate G (or voltage between the gate G and the cathode K) of the thyristor SCR is always set higher than its threshold and the thyristor SCR is on.

Thus, the flow of current between the anode A and the cathode K of the thyristor SCR depends on the state of the second field effect transistor FET2. That is, the current between the anode A and the cathode K of the thyristor SCR flows when the second field effect transistor FET2 is on, and does not flow when the second field effect transistor FET2 is off. When a direct-current voltage is properly supplied to the load 4, the second field effect transistor FET2 is off and this allows no current to flow between the anode A and the cathode K of the thyristor SCR.

If abnormal heating caused, for example, by a short circuit occurs during supply of direct-current voltage from the direct-current power source 3 to the load 4, the temperature of the positive temperature coefficient thermistor PTC increases rapidly. As the temperature of the positive temperature coefficient thermistor PTC increases, the resistance of the positive temperature coefficient thermistor PTC increases and the voltage at the node X of the temperature detector 6 also increases.

The abnormal heating is not always caused by a short circuit in the load 4. The abnormal heating may occur when the power line 1b between the drain D of the first field effect transistor FET1 and the load 4 is short-circuited with a portion of the ground line 2 between a node where the second fixed resistor R2 connects to the ground line 2 and the load 4.

As the voltage at the node X increases, the current flowing between the base B and the emitter E of the NPN transistor Q2 increases. When this current flows through the second fixed resistor R2, the potential at the node Y also increases. As a result, a voltage at the gate G of the first field effect transistor FET1 is set higher than a predetermined value. Thus, since a voltage between the gate G and the source S of the first field effect transistor FET1 is lower than its threshold, the first field effect transistor FET1 is turned off.

When the first field effect transistor FET1 is turned off, the supply of direct-current voltage from the direct-current power source 3 to the load 4 is stopped. That is, when the positive temperature coefficient thermistor PTC detects abnormal heating, the direct-current voltage supply circuit 100 stops the supply of direct-current voltage from the direct-current power source 3 to the load 4.

When the first field effect transistor FET1 is turned off, the potential of the power line 1b adjacent to the load 4 of the direct-current voltage supply circuit 100 reaches, or becomes close to, a short-circuit potential or 0 V, on the side of the load 4. At this point, a voltage at the node Z, or a voltage at the gate G of the second field effect transistor FET2, determined by the fourth fixed resistor R4 and the fifth fixed resistor R5, is set lower than a predetermined value. As a result, since a voltage between the gate G and the source S of the first field effect transistor FET1 exceeds its threshold, the second field effect transistor FET2 is turned on. When the second field effect transistor FET2 is turned on, current flows between the anode A and the cathode K of the thyristor SCR.

That is, the second field effect transistor FET2 remains on as long as the power line 1b adjacent to the load 4 is at the short-circuit potential. As a result, a voltage at the node Y, or a voltage at the gate G of the first field effect transistor FET1, is kept higher than a predetermined value. Thus, since the voltage between the gate G and the source S of the first field effect transistor FET1 is kept lower than its threshold, the first field effect transistor FET1 remains off.

When the thyristor SCR is on, current continues to flow between the anode A and the cathode K of the thyristor SCR unless the power line 1 and the anode A of the thyristor SCR are brought out of conduction. That is, the current continues to flow between the anode A and the cathode K of the thyristor SCR even when the supply of direct-current voltage from the direct-current power source 3 to the load 4 is stopped, abnormal heating is stopped, the positive temperature coefficient thermistor PTC naturally cools down, and the resistance of the positive temperature coefficient thermistor PTC decreases. This is because when the NPN transistor Q2 is on and the PNP transistor Q1 is also on, even when the voltage at the node X of the temperature detector 6 decreases, current (voltage) in the collector C of the PNP transistor Q1 continues to be applied to the base B of the NPN transistor Q2. That is, since this allows the NPN transistor Q2 to remain on, the PNP transistor Q1 also remains on.

Therefore, in the direct-current voltage supply circuit 100, even when the supply of direct-current voltage from the direct-current power source 3 to the load 4 is stopped, abnormal heating is stopped, the positive temperature coefficient thermistor PTC naturally cools down, and the resistance of the positive temperature coefficient thermistor PTC decreases, the first field effect transistor FET1 remains off as long as the power line 1b adjacent to the load 4 is at the short-circuit potential. This means that the supply of direct-current voltage is not automatically resumed.

After the supply of direct-current voltage from the direct-current power source 3 to the load 4 is stopped and the load 4 is isolated from the direct-current voltage supply circuit 100, the direct-current voltage supply circuit 100 opens at the end of the power line 1b adjacent to the load 4. Thus, the voltage at the node Z, or the voltage at the gate G of the second field effect transistor FET2, is brought through the fourth fixed resistor R4 to the voltage of the power line 1. The voltage at the gate G of the second field effect transistor FET2 at this point is set higher than a predetermined value. As a result, since the voltage between the gate G and the source S of the second field effect transistor FET2 falls below its threshold, the second field effect transistor FET2 is turned off. This stops the flow of current between the anode A and the cathode K of the thyristor SCR.

Then, after the cause of the abnormal heating is removed or eliminated, or after the load 4 is replaced with a normal one, the load 4 is connected to the direct-current voltage supply circuit 100 again. The direct-current voltage supply circuit 100 thus returns to the normal operating state, and resumes normal supply of direct-current voltage.

As described above, in the direct-current voltage supply circuit 100, once the supply of direct-current voltage from the direct-current power source 3 to the load 4 is stopped in response to abnormal heating caused, for example, by a short circuit on the side of the load 4, even when the temperature of the positive temperature coefficient thermistor PTC subsequently drops, the supply of direct-current voltage from the direct-current power source 3 to the load 4 is not resumed as long as the power line 1b adjacent to the load 4 is at the short-circuit potential.

Therefore, in the direct-current voltage supply circuit 100 according to the present preferred embodiment, after the supply of direct-current voltage from the direct-current power source 3 to the load 4 is stopped, the load 4 is isolated from the direct-current voltage supply circuit 100 to examine the cause of abnormal heating. Then, after the cause of the abnormal heating is removed or eliminated, or after the load 4 is replaced with a normal one, the load 4 is connected to the direct-current voltage supply circuit 100 again. Thus, the supply of direct-current voltage can be safely resumed.

Second Preferred Embodiment

Figure 5:
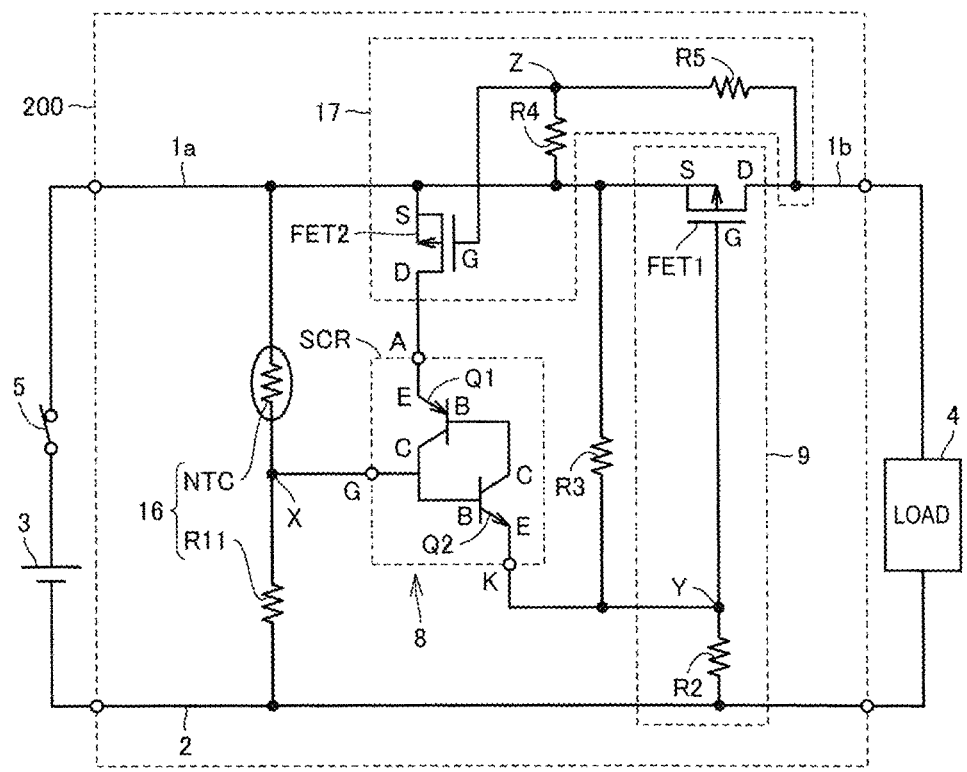
FIG. 5 is an equivalent circuit diagram of a direct-current voltage supply circuit 200 according to a second preferred embodiment of the present invention.

FIG. 5 is a circuit diagram of a direct-current voltage supply circuit 200 according to a second preferred embodiment of the present invention. Note that FIG. 5 is an equivalent circuit diagram of the direct-current voltage supply circuit 200.

The direct-current voltage supply circuit 200 is obtained by modifying a portion of the direct-current voltage supply circuit 100 according to the first preferred embodiment illustrated in FIG. 4.

In the direct-current voltage supply circuit 100 described above, the temperature detector 6 includes the first fixed resistor R1 and the positive temperature coefficient thermistor PTC that are connected in series. The temperature detector 6 is connected to the power line 1 at one end thereof adjacent to the first fixed resistor R1, and is connected to the ground line 2 at the other end thereof adjacent to the positive temperature coefficient thermistor PTC. The direct-current voltage supply circuit 200 is obtained by modifying this structure. That is, the direct-current voltage supply circuit 200 includes a temperature detector 16 including a negative temperature coefficient thermistor NTC and a first fixed resistor R11 that are connected in series. The temperature detector 16 is connected to the power line 1 at one end thereof adjacent to the negative temperature coefficient thermistor NTC, and is connected to the ground line 2 at the other end thereof adjacent to the first fixed resistor R11. The remaining configuration of the direct-current voltage supply circuit 200 is the same or substantially the same as that of the direct-current voltage supply circuit 100.

In the direct-current voltage supply circuit 200, the occurrence of abnormal heating increases the temperature of the negative temperature coefficient thermistor NTC, decreases the resistance of the negative temperature coefficient thermistor NTC, and increases the voltage at the node X of the temperature detector 16. As the voltage at the node X increases, the current flowing between the base B and the emitter E of the NPN transistor Q2 increases, and the potential at the node Y also increases. As a result, a voltage at the gate G of the first field effect transistor FET1 is set higher than a predetermined value. Thus, since the voltage between the gate G and the source S of the first field effect transistor FET1 falls below its threshold, the first field effect transistor FET1 is turned off. The first field effect transistor FET1 thus stops the supply of direct-current voltage from the direct-current power source 3 to the load 4.

In the direct-current voltage supply circuit 200 according to the present preferred embodiment, after the supply of direct-current voltage is stopped in response to abnormal heating, even if the temperature of the negative temperature coefficient thermistor NTC subsequently drops, the supply of direct-current voltage is not resumed unless the load 4 is isolated from the direct-current voltage supply circuit 200 and connected to the direct-current voltage supply circuit 200 again. Therefore, after the cause of the abnormal heating is examined and the cause of the abnormal heating removed or eliminated, or the load is replaced with a normal one, the supply of direct-current voltage can be safely resumed.

Third Preferred Embodiment

Figure 6:
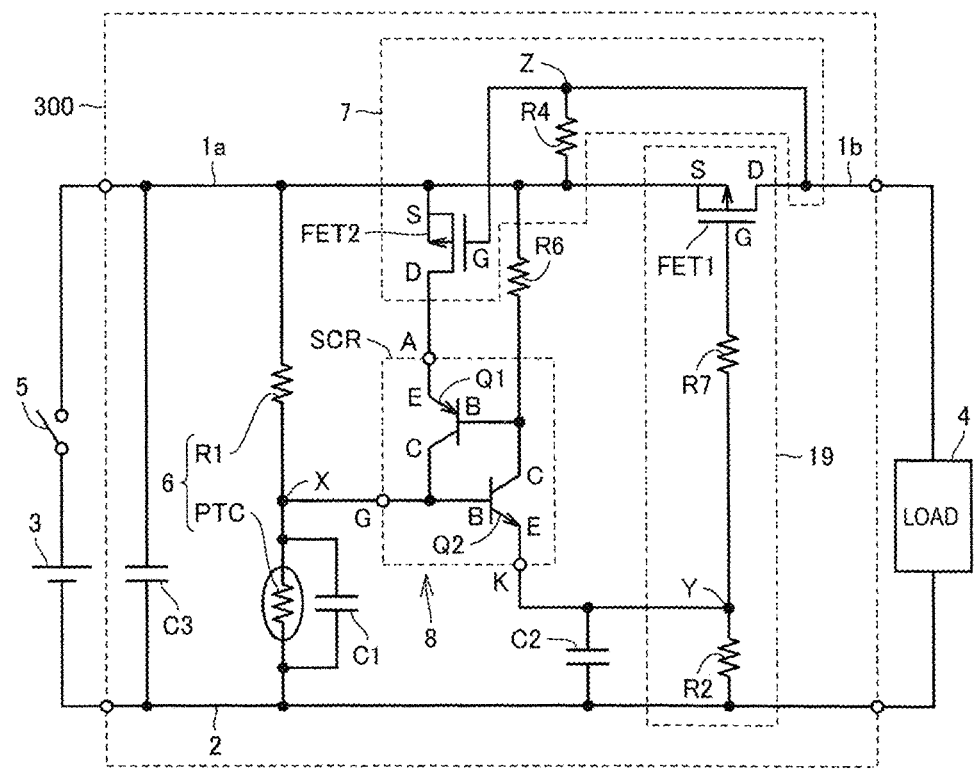
FIG. 6 is an equivalent circuit diagram of a direct-current voltage supply circuit 300 according to a third preferred embodiment of the present invention.

FIG. 6 is a diagram illustrating a configuration of a direct-current voltage supply circuit 300 according to a third preferred embodiment of the present invention. Note that FIG. 6 is an equivalent circuit diagram of the direct-current voltage supply circuit 300.

The direct-current voltage supply circuit 300 is also obtained by modifying a portion of the direct-current voltage supply circuit 100 according to the first preferred embodiment.

The direct-current voltage supply circuit 300 includes a first capacitor C1 connected in parallel with the positive temperature coefficient thermistor PTC of the temperature detector 6, which is included in the direct-current voltage supply circuit 100. The direct-current voltage supply circuit 300 also includes a second capacitor C2 connected between the node Y and the ground line 2, and a third capacitor C3 connected between the power line 1a adjacent to the direct-current power source 3 and the ground line 2. Additionally, the direct-current voltage supply circuit 300 includes a sixth fixed resistor R6 connected between the power line 1a adjacent to the direct-current power source 3 and the base B of the PNP transistor Q1 (or the collector C of the NPN transistor Q2), and a seventh fixed resistor R7 connected between the gate G of the first field effect transistor FET1 and the node Y. The remaining configuration of the direct-current voltage supply circuit 300 is the same or substantially the same as that of the direct-current voltage supply circuit 100.

Figure 7:
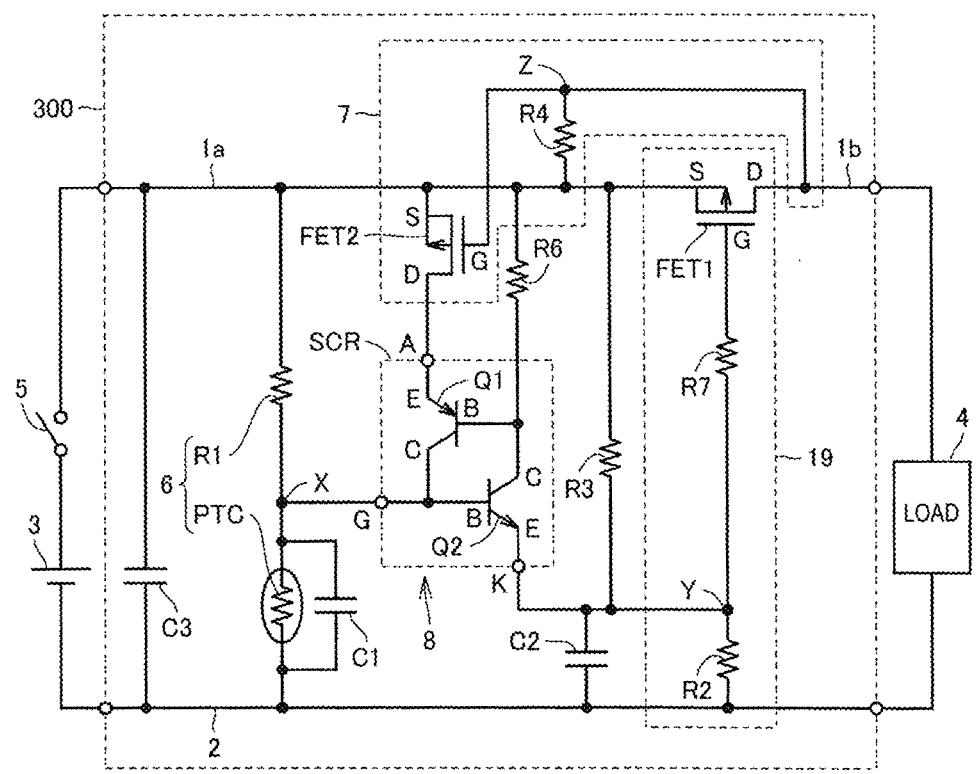
FIG. 7 illustrates a first exemplary modification of the circuit illustrated in FIG. 6.

FIG. 7 illustrates a first exemplary modification of the circuit according to the third preferred embodiment illustrated in FIG. 6. In the configuration illustrated in FIG. 7, the direct-current voltage supply circuit 300 includes the resistor R3 connected between the power line 1a adjacent to the direct-current power source 3 and the node Y. By adding the resistor R3 with an appropriate resistance, a voltage at the node Y can be regulated.

Figure 8:
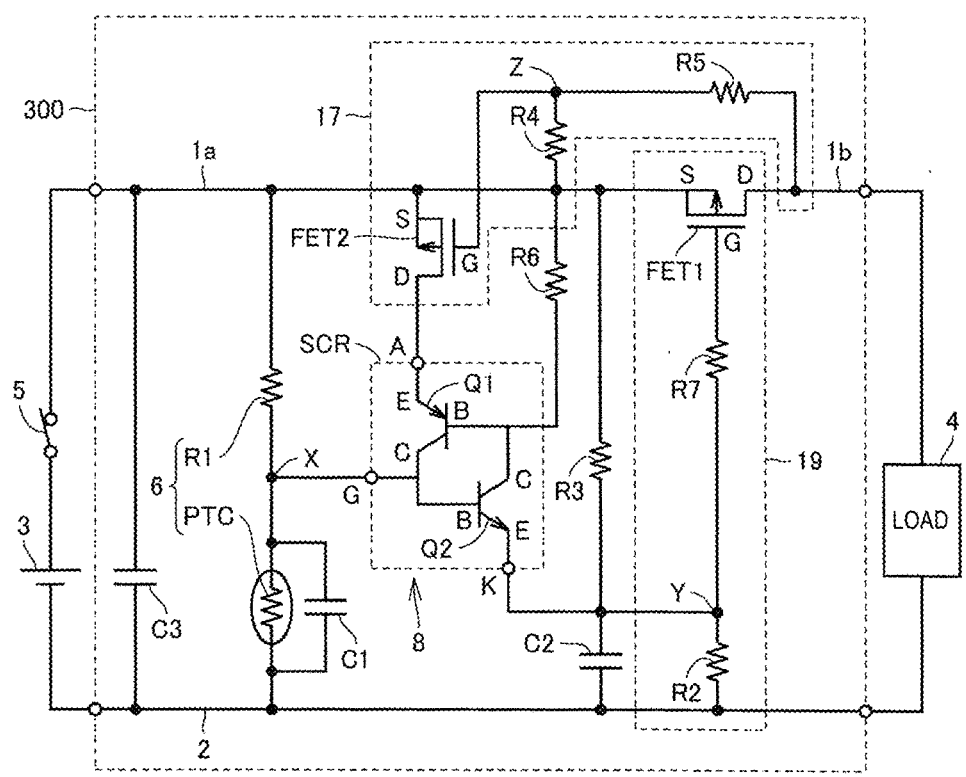
FIG. 8 illustrates a second exemplary modification of the circuit illustrated in FIG. 6.

FIG. 8 illustrates a second exemplary modification of the circuit according to the third preferred embodiment illustrated in FIG. 6. In the configuration illustrated in FIG. 8, the direct-current voltage supply circuit 300 includes the resistor R3 connected between the power line 1a adjacent to the direct-current power source 3 and the node Y, and further includes the reset circuit 17 instead of the reset circuit 7. The reset circuit 17 includes the resistor R5 connected between the node Z and the power line 1b adjacent to the load 4. By adding the resistors R3 and R5 with appropriate resistances, voltages at the nodes Y and Z can be regulated. Since basic configurations and operations illustrated in FIGS. 6, 7, and 8 have common features, the details will be described using FIG. 8.

In the direct-current voltage supply circuit 300, which includes the first capacitor C1, even if noise is applied to the gate G of the thyristor SCR (or to the base B of the NPN transistor Q2), the noise can be dropped through the first capacitor C1 to the ground line 2. This prevents variations in potential at the node Y caused by current produced by such noise and flowing through the second fixed resistor R2. Thus, since the first field effect transistor FET1 is not turned off by a malfunction, the supply of direct-current voltage from the direct-current power source 3 to the load 4 is not erroneously stopped.

With the first capacitor C1, the direct-current voltage supply circuit 300 of the present preferred embodiment achieves not only the advantageous effects of the direct-current voltage supply circuit 100, but also the advantageous effect of preventing a noise-induced malfunction from stopping the supply of direct-current voltage from the direct-current power source 3 to the load 4.

With the second capacitor C2, the direct-current voltage supply circuit 300 reduces small variations in potential at the node Y caused, for example, by noise, and stabilizes the potential at the gate G of the first field effect transistor FET1. The direct-current voltage supply circuit 300 thus achieves not only the advantageous effects of the direct-current voltage supply circuit 100, but also the advantageous effect of preventing noise from causing the first field effect transistor FET1 to malfunction.

With the third capacitor C3, the direct-current voltage supply circuit 300 reduces small variations in source potential caused, for example, by noise. It is thus possible to achieve not only the advantageous effects of the direct-current voltage supply circuit 100, but also the advantageous effect of preventing noise from causing the direct-current voltage supply circuit 300 to malfunction.

With the sixth fixed resistor R6, the direct-current voltage supply circuit 300 amplifies the current flowing through the NPN transistor Q2 and reliably turns on the first field effect transistor FET1 in response to abnormal heating. The direct-current voltage supply circuit 300 thus achieves not only the advantageous effects of the direct-current voltage supply circuit 100, but also the advantageous effect of reliably stopping the supply of direct-current voltage from the direct-current power source 3 to the load 4 in the event of abnormal heating.

With the seventh fixed resistor R7, the direct-current voltage supply circuit 300 reduces small variations in potential at the node Y caused, for example, by noise, and stabilizes the potential at the gate G of the first field effect transistor FET1. The direct-current voltage supply circuit 300 thus achieves not only the advantageous effects of the direct-current voltage supply circuit 100, but also the advantageous effect of preventing noise from causing the first field effect transistor FET1 to malfunction.

Although FIG. 8 illustrates a circuit configuration that includes the first capacitor C1, the second capacitor C2, the third capacitor C3, the sixth fixed resistor R6, and the seventh fixed resistor R7, the configuration is not limited to this. As illustrated in FIGS. 6 and 7, with at least one of these circuit elements, it is possible to achieve advantageous effects in addition to those achieved by the direct-current voltage supply circuit 100.

Fourth Preferred Embodiment

Figure 9:
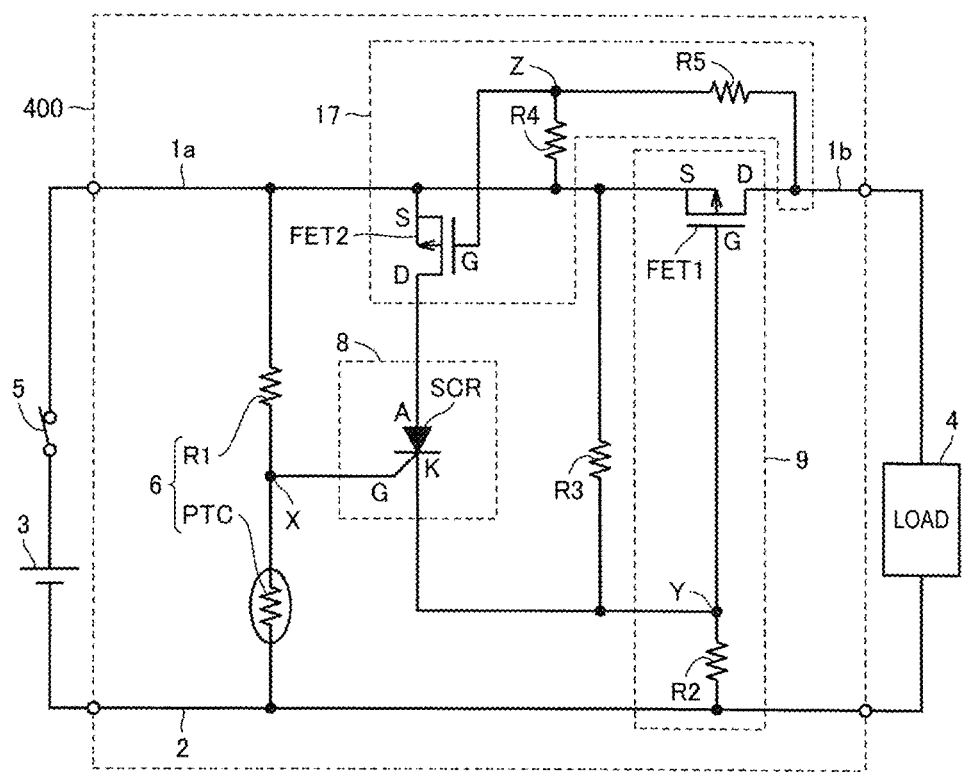
FIG. 9 is an equivalent circuit diagram of a direct-current voltage supply circuit 400 according to a fourth preferred embodiment of the present invention.

FIG. 9 is a diagram illustrating a configuration of a direct-current voltage supply circuit 400 according to a fourth preferred embodiment of the present invention. Note that FIG. 9 is an equivalent circuit diagram of the direct-current voltage supply circuit 400.

The direct-current voltage supply circuit 400 is also obtained by modifying a portion of the direct-current voltage supply circuit 100 according to the first preferred embodiment.

In the direct-current voltage supply circuit 100 described above, the thyristor SCR includes the PNP transistor Q1 and the NPN transistor Q2. The direct-current voltage supply circuit 400 is obtained by modifying this structure. That is, in the direct-current voltage supply circuit 400, the thyristor SCR includes a single electronic component. The remaining configuration of the direct-current voltage supply circuit 400 is the same or substantially the same as that of the direct-current voltage supply circuit 100.

The thyristor SCR including a single electronic component functions similarly to the thyristor SCR including the PNP transistor Q1 and the NPN transistor Q2.

As described above, the thyristor SCR used in the direct-current voltage supply circuit according to preferred embodiments of the present invention may either include the PNP transistor Q1 and the NPN transistor Q2, or may include a single electronic component.

Fifth Preferred Embodiment

Figure 10:
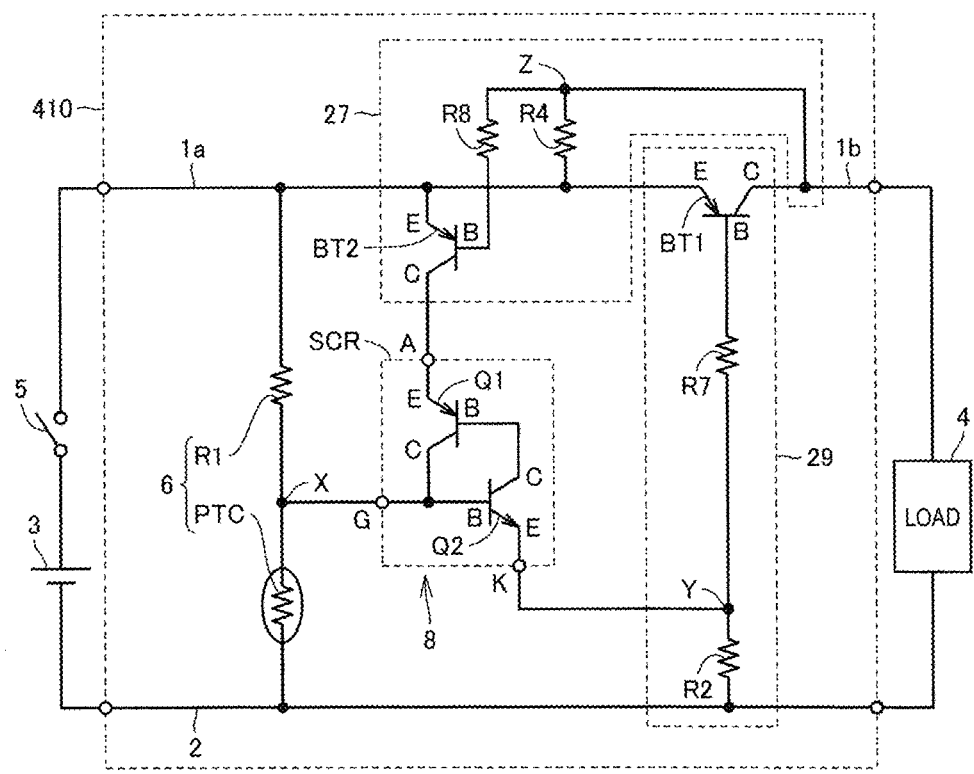
FIG. 10 is a diagram illustrating a configuration of a direct-current voltage supply circuit 410 according to a fifth preferred embodiment of the present invention.

FIG. 10 is a diagram illustrating a configuration of a direct-current voltage supply circuit 410 according to a fifth preferred embodiment of the present invention. Note that FIG. 10 is an equivalent circuit diagram of the direct-current voltage supply circuit 410.

The direct-current voltage supply circuit 410 is also obtained by modifying a portion of the direct-current voltage supply circuit 100 according to the first preferred embodiment.

In the direct-current voltage supply circuit 100, the first field effect transistor FET1 defines a switch for the power source connecting circuit 9, and the second field effect transistor FET2 defines a switch for the reset circuit 7. The direct-current voltage supply circuit 410 includes a reset circuit 27, instead of the reset circuit 7, and includes a power source connecting circuit 29, instead of the power source connecting circuit 9. The power source connecting circuit 29 includes a PNP bipolar transistor BT1 and a base current limiting resistor R7, instead of the first field effect transistor FET1. The reset circuit 27 includes an PNP bipolar transistor BT2 and a base current limiting resistor R8, instead of the second field effect transistor FET2. The remaining configuration of the direct-current voltage supply circuit 410 is the same or substantially the same as that of the direct-current voltage supply circuit 100.

Figure 11:
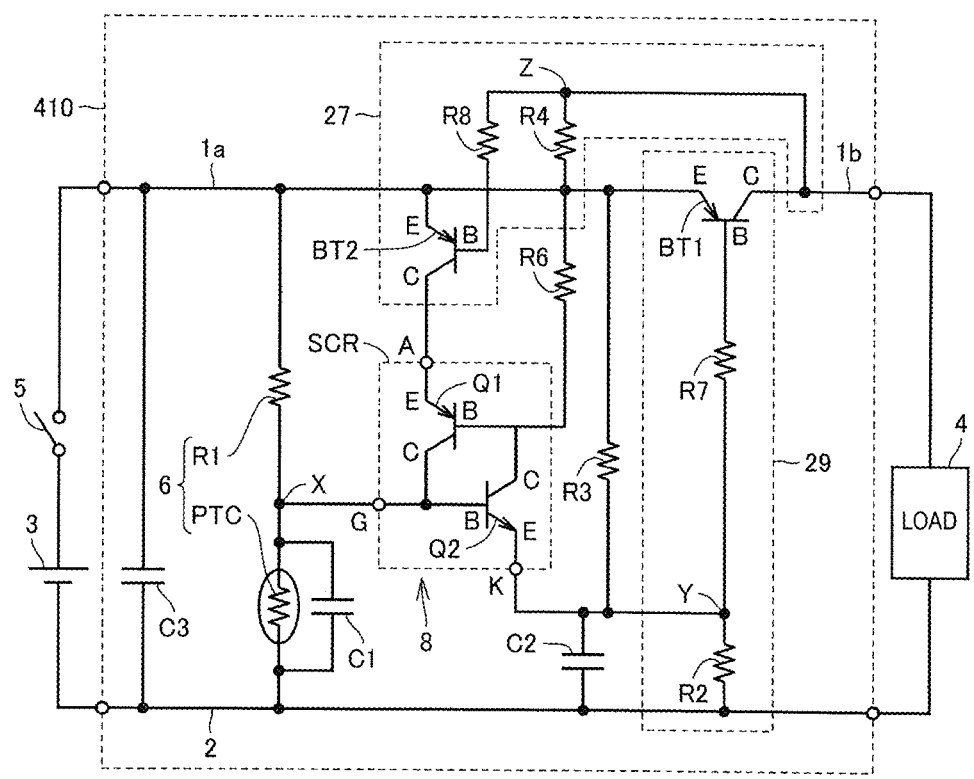
FIG. 11 illustrates an exemplary modification of the circuit illustrated in FIG. 10.

FIG. 11 illustrates an exemplary modification of the circuit illustrated in FIG. 10. In the configuration illustrated in FIG. 11, the direct-current voltage supply circuit 410 includes the resistor R3 connected between the power line 1a adjacent to the direct-current power source 3 and the node Y. By adding the resistor R3 with an appropriate resistance, a voltage at the node Y can be regulated. In the configuration illustrated in FIG. 11, the direct-current voltage supply circuit 410 further includes the capacitors C1 to C3. Adding the capacitors improves noise immunity similarly to the third preferred embodiment.

The PNP bipolar transistors BT1 and BT2 configured as illustrated in FIGS. 10 and 11 function similarly to the field effect transistors FET1 and FET2.

As described above, the switches used in the direct-current voltage supply circuits of preferred embodiments of the present invention may be field effect transistors or bipolar transistors, for example. Other types of switches, such as IGBTs, for example, may be used, or some of the switches described above may be used in combination.

Sixth Preferred Embodiment

A sixth preferred embodiment of the present invention primarily discusses modifications of the temperature detector 6 illustrated in FIG. 1.

Figure 12:
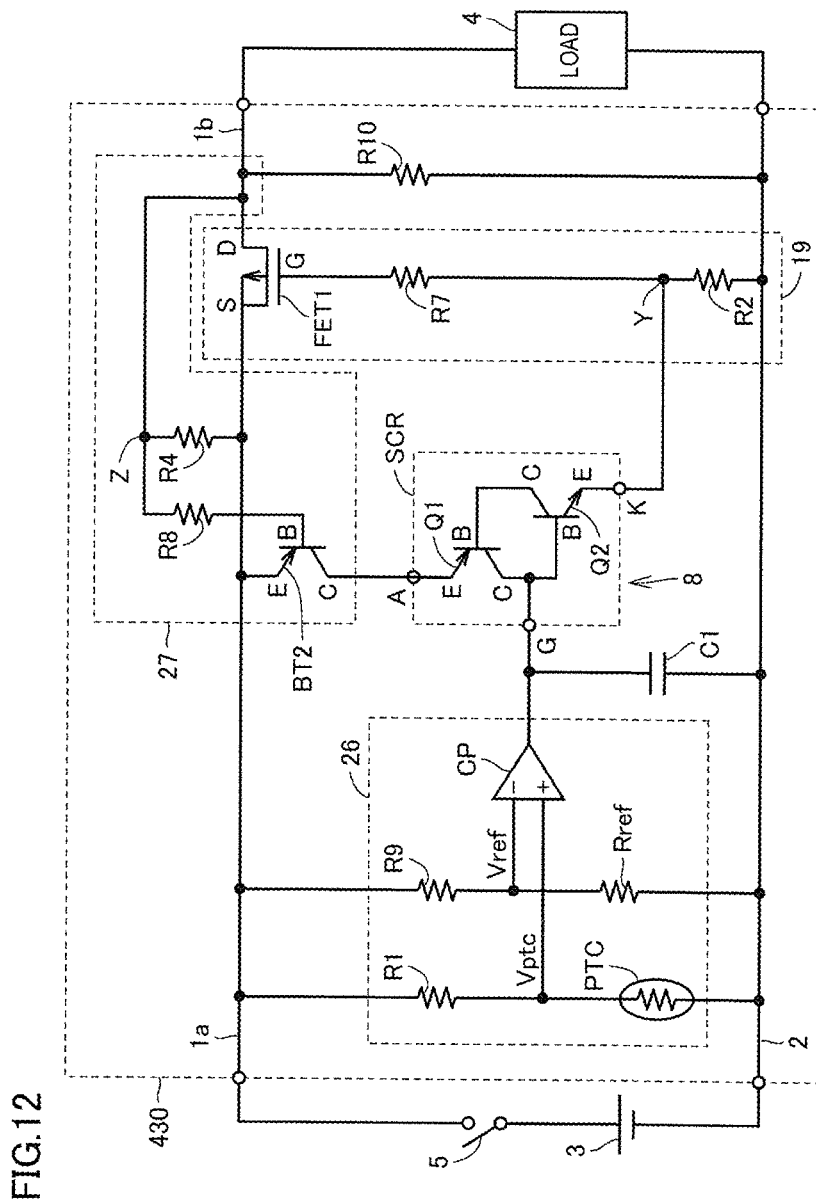
FIG. 12 is a diagram illustrating a configuration of a direct-current voltage supply circuit 430 according to a sixth preferred embodiment of the present invention.

FIG. 12 is a diagram illustrating a configuration of a direct-current voltage supply circuit 430 according to the sixth preferred embodiment. Note that FIG. 12 is an equivalent circuit diagram of the direct-current voltage supply circuit 430.

The direct-current voltage supply circuit 430 is also obtained by modifying a portion of the direct-current voltage supply circuit 100 according to the first preferred embodiment.

Although the direct-current voltage supply circuit 100 includes the temperature detector 6 including the resistor R1 and the positive temperature coefficient thermistor PTC connected in series, the direct-current voltage supply circuit 430 includes a temperature detector 26 instead of the temperature detector 6.

Also, the direct-current voltage supply circuit 430 includes the reset circuit 27 and a power source connecting circuit 19, instead of the reset circuit 7 and the power source connecting circuit 9, respectively. The remaining configuration of the direct-current voltage supply circuit 430 is the same or substantially the same as that of the direct-current voltage supply circuit 100. The reset circuit 27 described with reference to FIGS. 10 and 11, and the power source connecting circuit 19 illustrated in FIGS. 6 to 8, will not be described here, and the temperature detector 26 will be described in detail.

Figure 13:
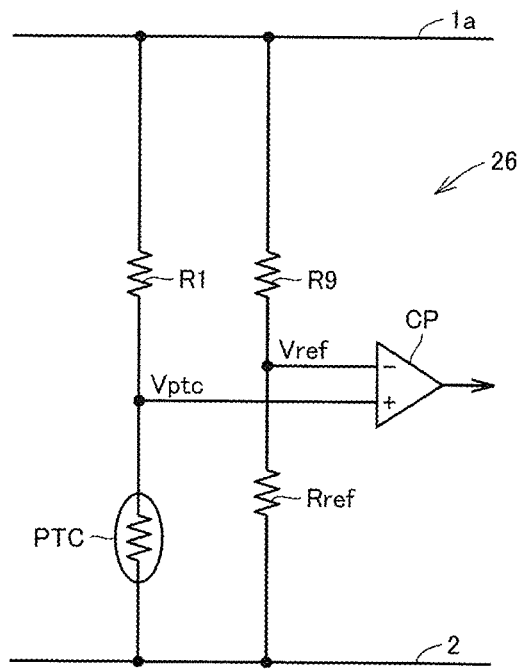
FIG. 13 is a circuit diagram illustrating a configuration of a temperature detector 26 which is a first exemplary modification of a temperature detector according to a preferred embodiment of the present invention.

FIG. 13 is a circuit diagram illustrating a configuration of the temperature detector 26 which is a first example of the temperature detector. The temperature detector 26 includes the fixed resistor R1 and the positive temperature coefficient thermistor PTC, a fixed resistor R9 and a reference resistor Rref, and a comparator CP. The fixed resistor R1 and the positive temperature coefficient thermistor PTC are connected in series between the power line 1a and the ground line 2, and configured to output a voltage Vptc from the intermediate node. The fixed resistor R9 and the reference resistor Rref are connected in series between the power line 1a and the ground line 2, and configured to output a voltage Vref from the intermediate node. The comparator CP compares the voltage Vptc and the voltage Vref.

The voltage Vref is a fixed voltage, and the voltage Vptc is a voltage that increases as the temperature increases. The resistances of the fixed resistors R1 and R9 and the reference resistor Rref are determined in accordance with the characteristics of the positive temperature coefficient thermistor PTC such that Vptc<Vref is satisfied during normal operation and Vptc>Vref is satisfied in the event of abnormal heating.

The negative input node of the comparator CP receives the voltage Vref, and the positive input node of the comparator CP receives the voltage Vptc. The comparator CP thus outputs a low level during normal operation, and outputs a high level in the event of abnormal heating. Thus, in the event of abnormal heating, the voltage at the node Y becomes higher than that during normal operation, and this turns off the first field effect transistor. Although the thyristor SCR is always on in the first preferred embodiment, the thyristor SCR may be off in the initial state.

Figure 14:
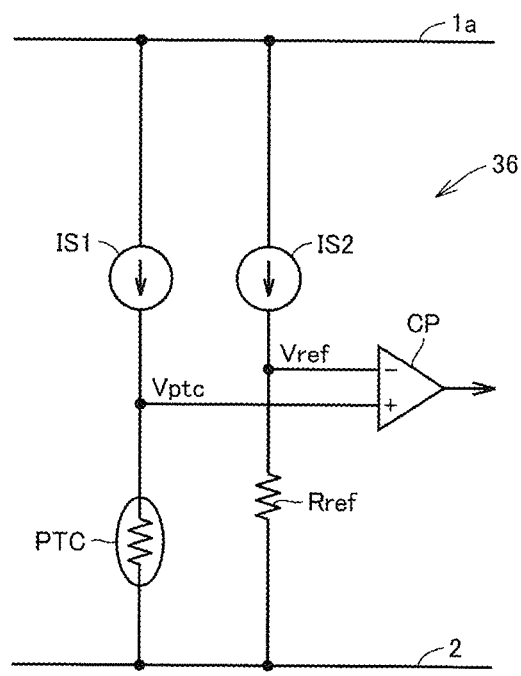
FIG. 14 is a circuit diagram illustrating a configuration of a temperature detector 36 which is a second exemplary modification of a temperature detector according to a preferred embodiment of the present invention.

FIG. 14 is a circuit diagram illustrating a configuration of a temperature detector 36 which is a second example of the temperature detector. Even when the fixed resistors R1 and R9 illustrated in FIG. 13 are replaced with constant current sources IS1 and IS2, respectively, as illustrated in FIG. 14, the comparator CP operates in the same or similar manner as that described above. Thus, the configuration in which the voltage is determined by the voltage divider of resistors may be replaced with the configuration in which the voltage is determined by the constant current sources.

Figure 15:
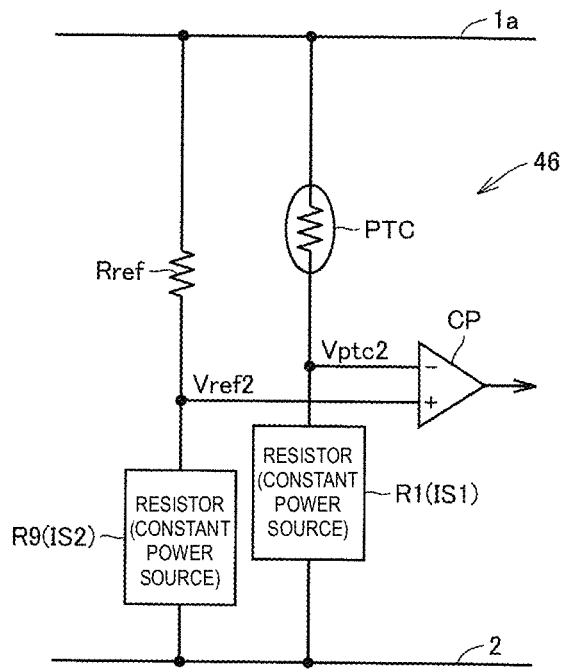
FIG. 15 is a circuit diagram illustrating a configuration of a temperature detector 46 which is a third exemplary modification of a temperature detector according to a preferred embodiment of the present invention.

FIG. 15 is a circuit diagram illustrating a configuration of a temperature detector 46 which is a third example of the temperature detector. The temperature detector 46 is obtained by modifying the configuration of FIG. 13 or 14 such that the positive temperature coefficient thermistor PTC is connected to the power line 1a and the resistor R1 or constant current source IS1 is connected to the ground line 2, and that the reference resistor Rref is connected to the power line 1a and the resistor R9 or constant current source IS2 is connected to the ground line 2. In this case, the connection of the comparator CP is changed such that the positive input receives Vref2 and the negative input receives Vptc2.

Although the positive temperature coefficient thermistor PTC is illustrated as a temperature-sensitive element in FIGS. 12 to 15, the temperature-sensitive element may be the negative temperature coefficient thermistor NTC, a thermocouple, a bimetal breaker, or an IC temperature sensor, for example.

Seventh Preferred Embodiment

A seventh preferred embodiment of the present invention primarily describes modifications of the state holding circuit 8 illustrated in FIG. 1.

Figure 16:
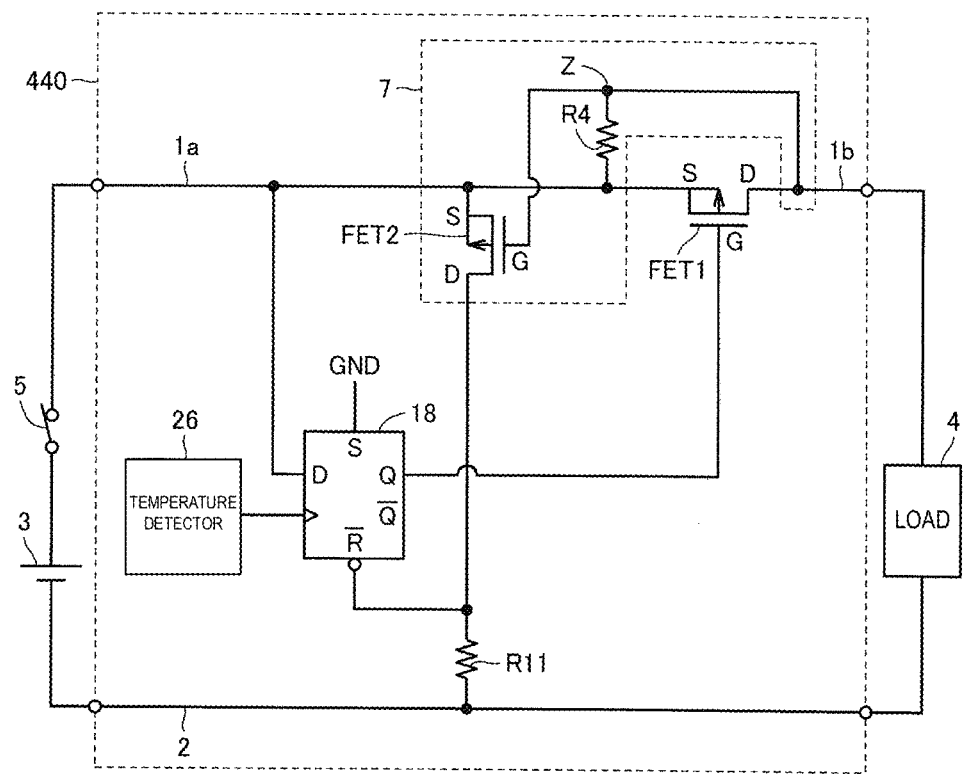
FIG. 16 is a diagram illustrating a configuration of a direct-current voltage supply circuit 440 according to a seventh preferred embodiment of the present invention.

FIG. 16 is a diagram illustrating a configuration of a direct-current voltage supply circuit 440 according to the seventh preferred embodiment. The direct-current voltage supply circuit 440 includes the temperature detector 26, the reset circuit 7, a flip-flop 18 including a reset terminal defining and functioning as a state holding circuit, the pull-down resistor R11 to determine the potential of the reset terminal, and the first field effect transistor FET1 defining and functioning as a power source connecting circuit. As described in the sixth preferred embodiment, the temperature detector 26 includes the comparator CP at the output thereof. The flip-flop 18 including the reset terminal is capable of outputting either a high level or a low level, and this reduces or eliminates the need for the resistor R2 illustrated in FIG. 3 and others. The reset circuit 7 and the remaining configuration are the same or substantially the same as those of the first preferred embodiment. The operation of the flip-flop 18 will now be described.

A D terminal of the flip-flop 18 is always set to high (logical 1). The output of the temperature detector 26 is connected to a CLK terminal of the flip-flop 18.

When the direct-current voltage supply circuit 440 is connected to the direct-current power source 3 in the initial state where the load 4 is not connected, the node Z goes high and the second field effect transistor FET2 turns off. Therefore, by the pull-down resistor R11, the reset terminal is set to low (active) and the initial value of the output Q of the flip-flop 18 is set to low (logical 0). The first field effect transistor FET1 thus goes into conduction, and the supply of direct-current voltage can start upon connection of the load 4.

When the resistance of the positive temperature coefficient thermistor PTC is low in the normal state, since the output from the comparator CP remains low, the output Q remains low and the first field effect transistor FET1 remains conducting.

If abnormal heating increases the temperature of the temperature detector 26 and changes the output of the comparator CP from low to high, the output Q goes high on the rising edge and turns off the first field effect transistor FET1. If short circuit of the load 4 or connector terminal causes a voltage drop in the power line 1b at this point, since the second field effect transistor FET2 of the reset circuit 7 goes into conduction and the voltage of the reset terminal /R goes high, the reset of the flip-flop 18 is cancelled.

Even when the temperature subsequently drops and the output of the comparator CP falls from high to low, the flip-flop 18 holds the output Q high and the first field effect transistor FET1 remains off.

When the load 4 is isolated from the power line 1b, the reset terminal /R is reset by the reset circuit 7. That is, since isolating the load 4 in a short-circuited state drives the power line 1b high, the second field effect transistor FET2 is turned off, the reset terminal /R is driven low (active) by the pull-down resistor R11, and the flip-flop 18 is reset. Thus, since the output Q of the flip-flop 18 goes low, the first field effect transistor FET1 goes into conduction and the direct-current voltage supply circuit 440 becomes ready to supply direct-current voltage to the load 4 again.

Figure 17:
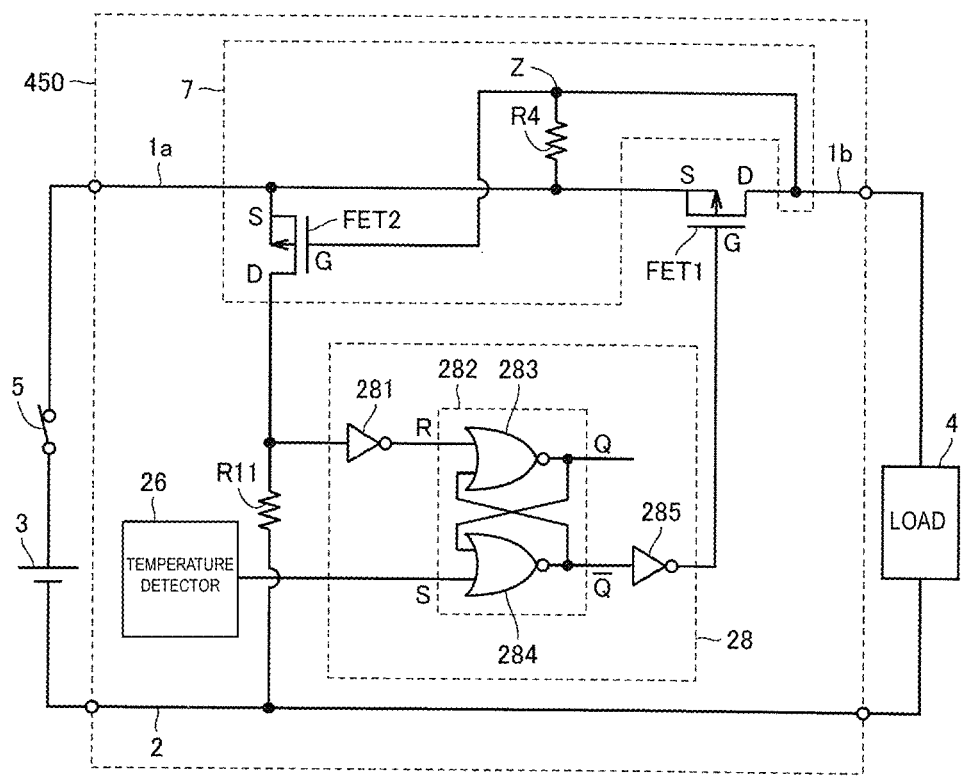
FIG. 17 is a diagram illustrating a configuration of a direct-current voltage supply circuit 450 according to an exemplary modification of the seventh preferred embodiment of the present invention.

FIG. 17 is a diagram illustrating a configuration of a direct-current voltage supply circuit 450 according to an exemplary modification of the seventh preferred embodiment. The direct-current voltage supply circuit 450 is obtained by replacing the flip-flop 18 in the configuration of FIG. 16 with a state holding circuit 28. The other configuration is the same as that illustrated in FIG. 16.

The state holding circuit 28 includes an inverter 281 and an SR latch circuit 282. The SR latch circuit 282 includes NOR gates 283 and 284.

When the direct-current voltage supply circuit 450 is connected to the direct-current power source 3 in the initial state where the load 4 is not connected, the node Z goes high and the second field effect transistor FET2 turns off. Therefore, by the pull-down resistor R11 and the inverter 281, the reset terminal R of the SR latch circuit 282 is set to high (active), the initial value of the output Q of the SR latch circuit 282 is set to low (logical 0), and the initial value of the output /Q of the SR latch circuit 282 is set to high (logical 1). Since the output /Q is inverted by the inverter 285 and applied to the gate, the first field effect transistor FET1 goes into conduction and the supply of direct-current voltage can start upon connection of the load 4.

In the normal state, where the output from the comparator CP remains low, the output /Q of the SR latch circuit 282 remains high and the first field effect transistor FET1 remains conducting.

If abnormal heating increases the temperature of the temperature detector 26 and changes the output of the comparator CP from low to high, a set terminal S of the SR latch circuit 282 goes high and the output /Q immediately goes low in response. This turns off the first field effect transistor FET1. If a short circuit of the load 4 or connector terminal causes a voltage drop in the power line 1b at this point, since the second field effect transistor FET2 of the reset circuit 7 goes into conduction, the reset terminal /R of the SR latch circuit 282 goes low.

Even when the temperature subsequently drops and the output of the temperature detector 26 falls from high to low, the SR latch circuit 282 holds the output /Q low and the first field effect transistor FET1 remains off.

When the load 4 is isolated from the power line 1b, the SR latch circuit 282 is reset by the reset circuit 7. That is, the second field effect transistor FET2 is turned off and the reset terminal R of the SR latch circuit 282 is driven high by the resistor R11 and the inverter 281. Thus, since the output /Q of the SR latch circuit 282 goes high, the first field effect transistor FET1 goes into conduction and the direct-current voltage supply circuit 440 becomes ready to supply direct-current voltage to the load 4 again.

Thus, as illustrated in FIGS. 16 and 17, a flip-flop or a latch circuit, for example, may define and function as the state holding circuit.

Eighth Preferred Embodiment

Figure 18:
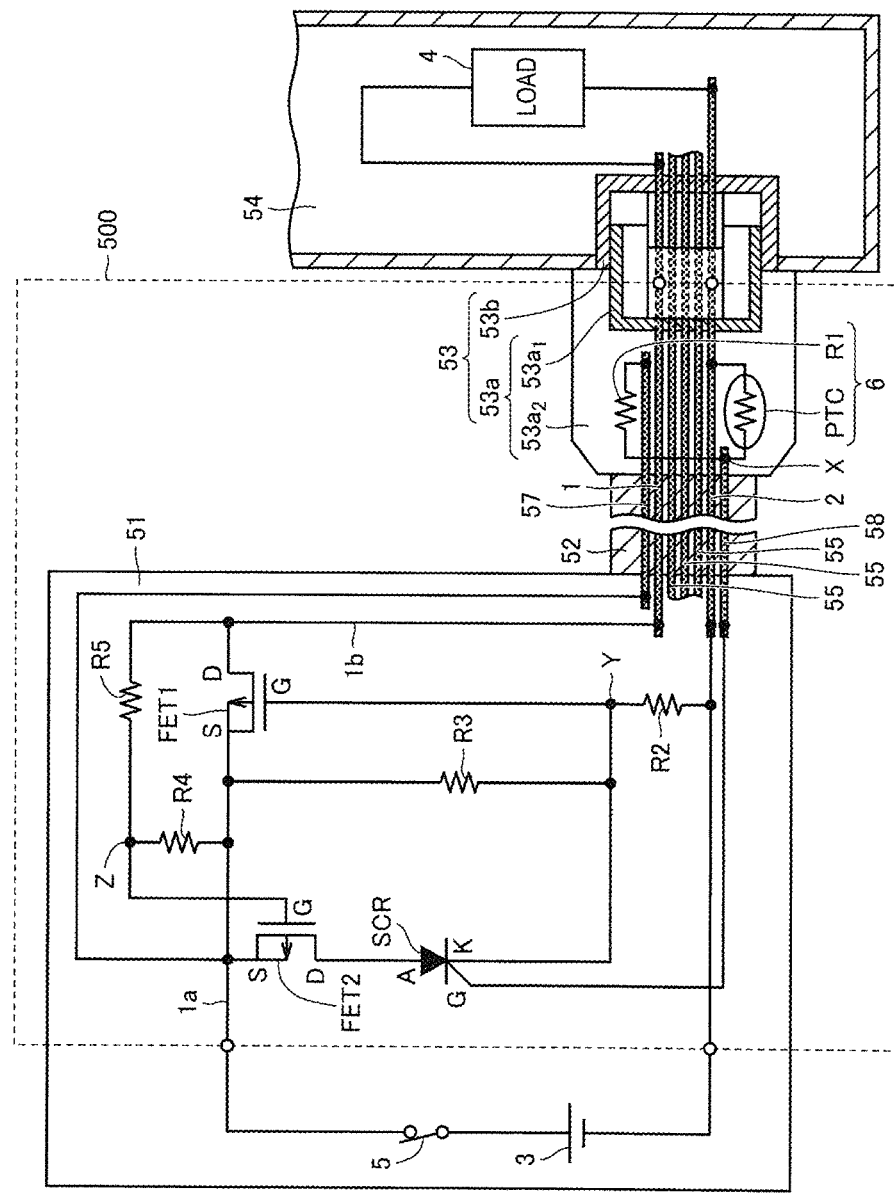
FIG. 18 is an explanatory diagram illustrating how a direct-current voltage supply circuit 500 according to an eighth preferred embodiment of the present invention is incorporated in an adapter 51, a cable 52, and a USB connector 53 (male USB connector 53a) and connected to an electronic device 54.

FIG. 18 is a diagram illustrating a configuration of a direct-current voltage supply circuit 500 according to an eighth preferred embodiment of the present invention. Note that FIG. 18 is an explanatory diagram of the direct-current voltage supply circuit 500.

The direct-current voltage supply circuit 500 is obtained by incorporating the direct-current voltage supply circuit 400 according to the fourth preferred embodiment into an adapter 51, a cable 52, and a USB connector 53 (male USB connector 53a). Note that USB stands for Universal Serial Bus which is a serial bus standard for connecting peripherals to an information device, such as a computer, for example.

The adapter 51 includes the direct-current power source 3 and the power switch 5. The direct-current power source 3 is a power source obtained, for example, by converting a commercial alternating-current power source into direct current of a predetermined voltage. Although the adapter 51 is used in the present preferred embodiment, a personal computer with a direct-current power source may be used, for example, instead of the adapter 51. The power switch 5 is optional.

The cable 52 includes a plurality of signal lines 55, the power line 1, the ground line 2, and abnormal-heating detection lines 57 and 58. The signal lines 55 are used to exchange signals between the adapter 51 and an electronic device 54. When a personal computer is used, instead of the adapter 51, as described above, the signal lines 55 are used to exchange signals between the personal computer and the electronic device 54.

The USB connector 53 includes the male USB connector 53a and a female USB connector 53b. The male USB connector 53a and the female USB connector 53b are capable of being engaged and disengaged with respect to each other. The male USB connector 53a and the female USB connector 53b each include contact points. Bringing these contact points into contact enables electrical connection between predetermined ones of the lines.

The male USB connector 53a is connected through the cable 52 to the adapter 51. The female USB connector 53b is attached to a housing of the electronic device 54.

The temperature detector 6 including the first fixed resistor R1 and the positive temperature coefficient thermistor PTC is embedded in an insulated portion of the male USB connector 53a. The first fixed resistor R1 is connected at one end thereof to one end of the abnormal-heating detection line 57, and is connected at the other end thereof to the node X. The other end of the abnormal-heating detection line 57 is connected through the cable 52 to the power line 1a adjacent to the direct-current power source 3. The positive temperature coefficient thermistor PTC is connected at one end thereof to the ground line 2, and connected at the other end thereof to the node X. The abnormal-heating detection line 58 allows the node X to be connected through the cable 52 to the gate G of the thyristor SCR in the adapter 51.

The electronic device 54 may be of any suitable type. For example, the electronic device 54 may be a mobile phone, a smartphone, or a music player. The adapter 51 includes therein the thyristor SCR, the field effect transistors FET1 and FET2, the second fixed resistor R2, the third fixed resistor R3, and the load 4. The load 4 is, for example, a secondary battery for the electronic device 54.

As described above, the gate G of the thyristor SCR is connected to the node X of the temperature detector 6. The anode A of the thyristor SCR is connected through the second field effect transistor FET2 to the power line 1a adjacent to the direct-current power source 3. The cathode K of the thyristor SCR is connected through the second fixed resistor R2 to the ground line 2.

The third fixed resistor R3 is connected between the power line 1a adjacent to the direct-current power source 3 and the node Y.

The first field effect transistor FET1 is disposed in the power line 1. More specifically, the source S of the first field effect transistor FET1 is connected to the power line 1a adjacent to the direct-current power source 3. The drain D of the first field effect transistor FET1 is connected to the power line 1b adjacent to the load 4. The gate G of the first field effect transistor FET1 is connected to the cathode K of the thyristor SCR, and to the node Y between the second fixed resistor R2 and the third fixed resistor R3.

The second field effect transistor FET2 is connected between the power line 1a adjacent to the direct-current power source 3 and the anode A of the thyristor SCR. More specifically, the source S of the second field effect transistor FET2 is connected to the power line 1a adjacent to the direct-current power source 3, and the drain D of the second field effect transistor FET2 is connected to the anode A of the thyristor SCR (or to the emitter E of the PNP transistor Q1).

The fourth fixed resistor R4 and the fifth fixed resistor R5 are connected between, and in parallel with, the source S and the drain D of the first field effect transistor FET1. The fourth fixed resistor R4 and the fifth fixed resistor R5 are connected in series, with the node Z therebetween. The node Z is connected to the gate G of the second field effect transistor FET2.

In the direct-current voltage supply circuit 500, a direct-current voltage is supplied from the direct-current power source 3 to the load 4 through the power line 1 and the ground line 2. As described above, the power line 1 can be divided at a given point between the drain D of the first field effect transistor FET1 and the load 4, and the ground line 2 can be divided at a given point between the node where the second fixed resistor connects to the ground line 2 and the load 4. The power line 1 and the ground line 2 that are each divided are connected together by the USB connector including the male USB connector 53a and the female USB connector 53b. The remaining configuration of the direct-current voltage supply circuit 500 is the same or substantially the same as that of the direct-current voltage supply circuit 400.

In the direct-current voltage supply circuit 500, the positive temperature coefficient thermistor PTC monitors abnormal heating in the vicinity of the USB connector 53. If abnormal heating is detected, the voltage at the node X increases, the current flowing between the base B and the emitter E of the NPN transistor Q2 increases, and the potential at the node Y also increases. This turns off the first field effect transistor FET1, and stops the supply of direct-current voltage from the direct-current power source 3 to the load 4.

This abnormal heating occurs not only when the load 4 in the electronic device 54 goes into an abnormal state, and the power line 1 and the ground line 2 are short-circuited through the load 4 in the abnormal state. For example, abnormal heating may occur when foreign matter gets caught in the USB connector 53 and this causes a short circuit between the power line 1*b* adjacent to the load 4 and the ground line 2.

In the direct-current voltage supply circuit 500, even when, after abnormal heating is detected and the supply of direct-current voltage is stopped, the positive temperature coefficient thermistor PTC naturally cools down and decreases in temperature, the thyristor SCR remains on and the first field effect transistor FET1 remains off unless the load 4 is isolated from the direct-current voltage supply circuit 500. That is, the supply of direct-current voltage is not automatically resumed. Therefore, in the direct-current voltage supply circuit 500, after the supply of direct-current voltage is stopped, the load 4 is isolated from the direct-current voltage supply circuit 500 to examine the cause of abnormal heating. Then, after the cause of the abnormal heating is removed or eliminated, or after the load 4 is replaced with a normal one, the load 4 is connected to the direct-current voltage supply circuit 500 again. The supply of direct-current voltage can thus be safely resumed. In the direct-current voltage supply circuit 500, the isolation and reconnection of the load 4 can be easily performed by the separation and reconnection of the male USB connector 53*a* and the female USB connector 53*b*.

Figure 19:
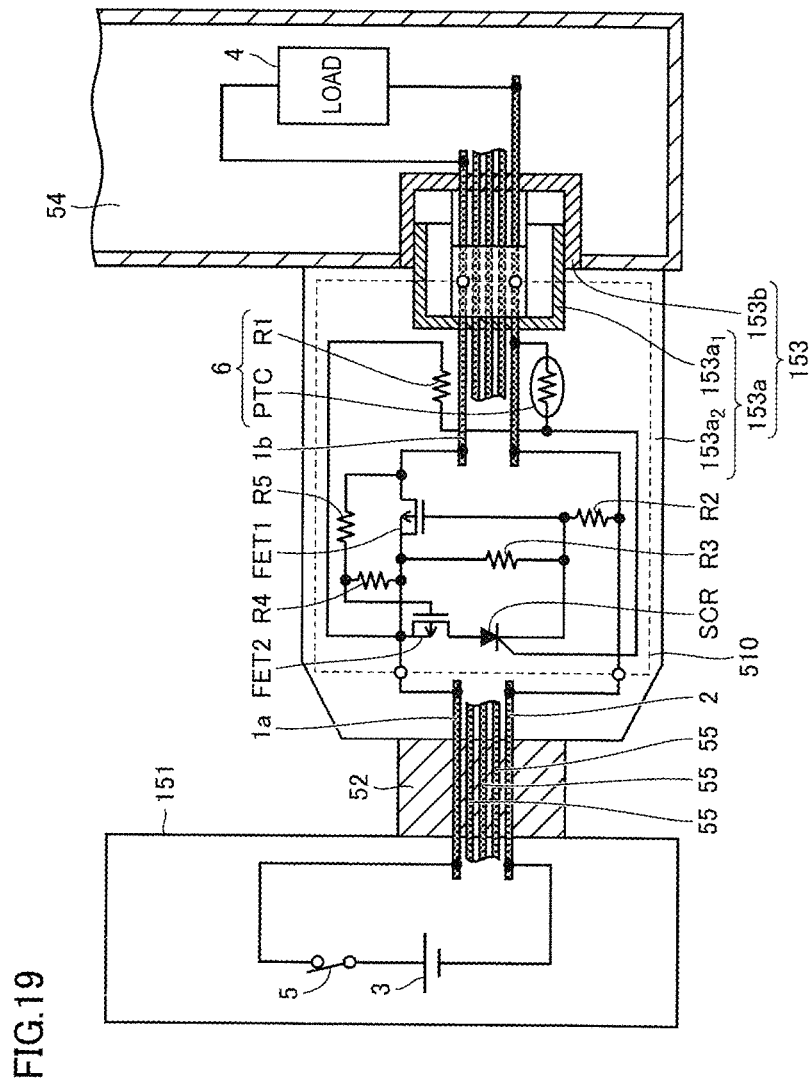
FIG. 19 is a diagram illustrating a configuration of a direct-current voltage supply circuit 510 according to an exemplary modification of the eighth preferred embodiment of the present invention.

FIG. 19 is a diagram illustrating a configuration of a direct-current voltage supply circuit 510 according to an exemplary modification of the eighth preferred embodiment of the present invention. In the configuration illustrated in FIG. 18, the temperature detector 6 including the first fixed resistor R1 and the positive temperature coefficient thermistor PTC is embedded in the insulated portion of the male USB connector 53*a*, and the other component elements of the direct-current voltage supply circuit 500 are disposed in the adapter 51 connected to the male USB connector 53*a* by the cable 52. The direct-current voltage supply circuit 510 illustrated in FIG. 19 includes a USB connector 153, instead of the USB connector 53.

The USB connector 153 includes a male USB connector 153*a* and a female USB connector 153*b*.

The male USB connector 153*a* is connected through the cable 52 to an adapter 151. The female USB connector 153*b* is attached to the housing of the electronic device 54.

In an insulated portion of the male USB connector 153*a*, the entire or substantially the entire direct-current voltage supply circuit 510 is embedded, as well as the temperature detector including the first fixed resistor R1 and the positive temperature coefficient thermistor PTC.

As illustrated in FIG. 19, embedding the entire or substantially the entire direct-current voltage supply circuit 510 in the insulated portion of the male USB connector 153*a* simplifies the configuration of the adapter 151.

Ninth Preferred Embodiment

A ninth preferred embodiment of the present invention includes a reset circuit with a modified configuration. In the first to eighth preferred embodiments, the reset circuit 7 resets the state holding circuit in response to recovery of the voltage of the power line 1*b* from low to high. However, the reset of the state holding circuit does not necessarily need to be executed based on the voltage of the power line 1*b*. For example, the removal of the load-side connector from the direct-current voltage supply circuit may be detected.

Figure 20:
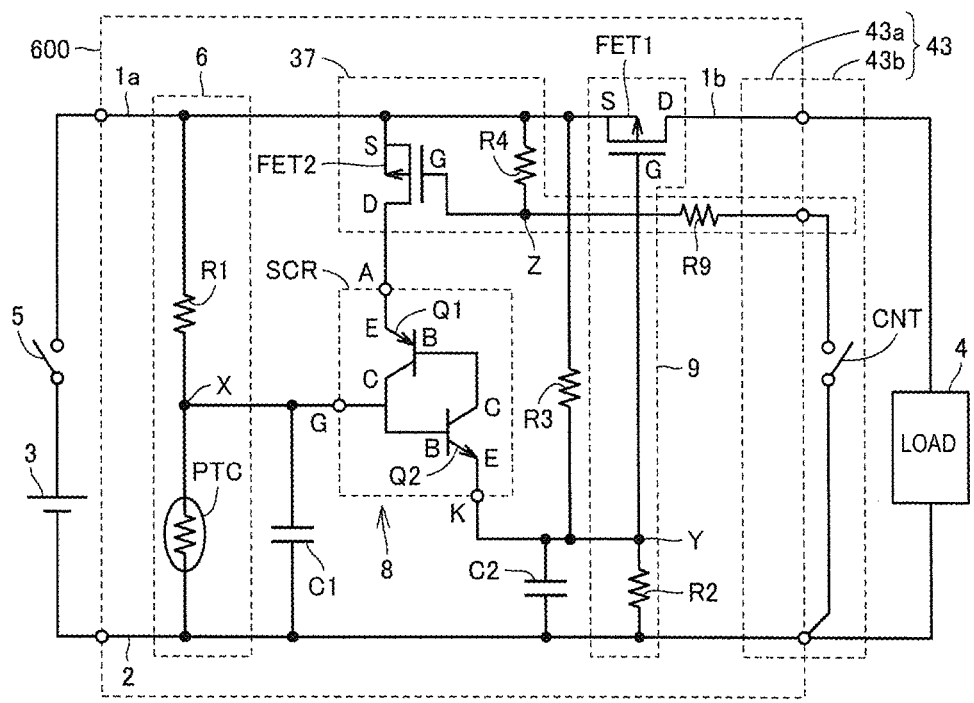
FIG. 20 is a diagram illustrating a configuration of a direct-current voltage supply circuit 600 according to a ninth preferred embodiment of the present invention.
Figure 21:
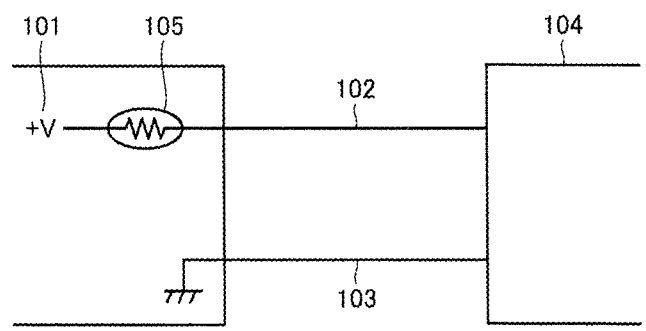
FIG. 21 is an equivalent circuit diagram of a direct-current voltage supply circuit 1100 disclosed in Japanese Unexamined Patent Application Publication No. 5-260647.

FIG. 20 is a diagram illustrating a configuration of a direct-current voltage supply circuit 600 according to the ninth preferred embodiment. The direct-current voltage supply circuit 600 is obtained by modifying a portion of the direct-current voltage supply circuit 100 according to the first preferred embodiment illustrated in FIG. 3.

In the direct-current voltage supply circuit 100, the reset circuit 7 resets the state holding circuit 8. The direct-current voltage supply circuit 600 includes a reset circuit 37, instead of the reset circuit 7. The direct-current voltage supply circuit 600 is connected by a connector 43 to the load 4.

The connector 43 includes a male connector 43*a* and a female connector 43*b*. The male connector 43*a* and the female connector 43*b* are capable of being engaged and disengaged with respect to each other. The male connector 43*a* and the female connector 43*b* each include contact points. Bringing these contact points into contact enables electrical connection between predetermined ones of the lines.

When the male connector 43*a* and the female connector 43*b* are brought into engagement, a switch CNT is brought into conduction and the resistor R9 is connected at an end portion thereof to the ground line 2. This lowers the voltage at the node Z and brings the second field effect transistor FET2 into conduction. On the other hand, when the female connector 43*b* is disengaged from the male connector 43*a*, the switch CNT is turned off and the resistor R9 is opened at the end portion thereof. This drives the voltage at the node Z high and turns off the second field effect transistor FET2. The switch CNT is optional. It is only necessary that the terminal of the resistor R9 is connected, on the side of the female connector 43*b*, to the ground line.

The remaining configuration of the direct-current voltage supply circuit 600 is the same or substantially the same as that of the direct-current voltage supply circuit 100 illustrated in FIG. 3, and the description will not be repeated here.

FIG. 20 illustrates an example where the reset is performed upon detecting the removal of the load-side connector from the direct-current voltage supply circuit. Alternatively, for example, a user-operated reset switch may be provided.

The direct-current voltage supply circuits 100 to 600 according to the first to ninth preferred embodiments of the present invention have been described. The present invention is not limited to the preferred embodiments described above and various changes can be made within the spirit and scope of the present invention.

For example, the equivalent circuit diagram for each preferred embodiment illustrates only the configuration relevant to the present invention, and other electronic components or functions may be added to the circuit. The circuit may be changed without affecting the scope of the present invention.

In the preferred embodiments described above, isolating the load 4 from any of the direct-current voltage supply circuits 100 to 600 does not only mean isolating the load 4 alone from the power line 1. It may also mean cutting off the connection in the power line 1*b* between the load 4 and the node between the drain D of the first field effect transistor FET1 and the fifth fixed resistor R5.

Although the USB connector 53 (including the male USB connector 53*a* and the female USB connector 53*b*) is used as the connector in the direct-current voltage supply circuit 500, the connector may be a different type of connector. Although the positive temperature coefficient thermistor PTC is included in the male USB connector 53*a* in the direct-current voltage supply circuit 500, the positive temperature coefficient thermistor PTC may be included in the electronic device 54.

Any of the preferred embodiments described above may be used in combination with one another.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A direct-current voltage supply circuit to be inserted between a direct-current power source and a load, the direct-current voltage supply circuit comprising:
   a power line;
   a ground line;
   a state holding circuit capable of being in either a first state or a second state;
   a power source connecting circuit disposed in at least one of the power line and the ground line, the power source connecting circuit to be in a connected state when the state holding circuit is in the first state and in a cutoff state when the state holding circuit is in the second state;
   a temperature detector to detect abnormal heating and bring the state holding circuit into the second state; and
   a reset circuit to bring the state holding circuit into the first state; wherein
   the power source connecting circuit includes a first switch disposed in the power line;
   the temperature detector includes a voltage divider between a portion of the power line adjacent to the direct-current power source and the ground line, the voltage divider including a first resistor and a thermistor connected in series;
   the state holding circuit includes a thyristor connected at a gate thereof to a node between the first resistor and the thermistor of the voltage divider, and connected at a cathode thereof to a control electrode of the first switch;
   the power source connecting circuit further includes a second resistor connected between the control electrode of the first switch and the ground line; and
   the reset circuit includes a second switch connected between the power line and an anode of the thyristor to receive at a control electrode thereof a signal varying in accordance with a voltage at a power terminal connected to the load.

2. The direct-current voltage supply circuit according to claim 1, wherein the first switch and the second switch are each either a field effect transistor or a bipolar transistor.

3. The direct-current voltage supply circuit according to claim 1, wherein by isolating the load from a portion of the power line adjacent to the load, the second switch and the first switch are turned off and on, respectively, and the supply of direct-current voltage through the power line is resumed.

4. The direct-current voltage supply circuit according to claim 1, wherein
   the temperature detector further includes:
   a second resistor and a third resistor connected in series between the portion of the power line adjacent to the direct-current power source and the ground line; and
   a comparator to compare a voltage at a node between the first resistor and the thermistor and a voltage at a node between the second resistor and the third resistor.

5. The direct-current voltage supply circuit according to claim 4, wherein the thermistor is a positive temperature coefficient thermistor.

6. The direct-current voltage supply circuit according to claim 4, wherein the first resistor is a fixed resistor.

7. The direct-current voltage supply circuit according to claim 1, wherein
   the thyristor includes a PNP transistor and an NPN transistor;
   a collector of the PNP transistor is connected to a base of the NPN transistor;
   a base of the PNP transistor is connected to a collector of the NPN transistor;
   an emitter of the PNP transistor corresponds to the anode of the thyristor;
   a node between the collector of the PNP transistor and the base of the NPN transistor corresponds to the gate of the thyristor; and
   an emitter of the NPN transistor corresponds to the cathode of the thyristor.

8. The direct-current voltage supply circuit according to claim 7, further comprising at least one of a first capacitor connected in parallel with the thermistor of the voltage divider, a second capacitor connected in parallel with the second resistor, a third capacitor connected between the portion of the power line adjacent to the direct-current power source and the ground line, a sixth resistor connected between the portion of the power line adjacent to the direct-current power source and the base of the PNP transistor, and a seventh resistor connected between the control electrode of the first switch and the cathode of the thyristor.

9. The direct-current voltage supply circuit according to claim 1, wherein
   the thermistor is a positive temperature coefficient thermistor;
   an end portion of the voltage divider adjacent to the first resistor is connected to the power line; and
   an end portion of the voltage divider adjacent to the positive temperature coefficient thermistor is connected to the ground line.

10. The direct-current voltage supply circuit according to claim 1, wherein
    the thermistor is a negative temperature coefficient thermistor;
    an end portion of the voltage divider adjacent to the negative temperature coefficient thermistor is connected to the power line; and
    an end portion of the voltage divider adjacent to the first resistor is connected to the ground line.

11. The direct-current voltage supply circuit according to claim 1, wherein
    the power line is divided at a given point between the first switch and the load, and the ground line is divided at a given point between a node where the second resistor connects to the ground line and the load;
    the power line and the ground line that are each divided are connected by a pair of connectors; and
    the thermistor monitors abnormal heating near the connectors.

12. The direct-current voltage supply circuit according to claim 11, wherein the pair of connectors are USB connectors.

13. A direct-current voltage supply circuit to be inserted between a direct-current power source and a load, the direct-current voltage supply circuit comprising:
    a power line;
    a ground line;
    a state holding circuit capable of being in either a first state or a second state;

a power source connecting circuit disposed in at least one of the power line and the ground line, the power source connecting circuit to be in a connected state when the state holding circuit is in the first state and in a cutoff state when the state holding circuit is in the second state;

a temperature detector to detect abnormal heating and bring the state holding circuit into the second state; and a reset circuit to bring the state holding circuit into the first state; wherein the state holding circuit includes a flip-flop circuit to receive at a clock terminal thereof an output of the temperature detector, connected at a D input terminal thereof to a portion of the power line adjacent to the direct-current power source, and reset in response to an output of the reset circuit.

14. The direct-current voltage supply circuit according to claim 13, wherein the power source connecting circuit is disposed in the power line.

15. A direct-current voltage supply circuit to be inserted between a direct-current power source and a load, the direct-current voltage supply circuit comprising:

a power line;

a ground line;

a state holding circuit capable of being in either a first state or a second state;

a power source connecting circuit disposed in at least one of the power line and the ground line, the power source connecting circuit to be in a connected state when the state holding circuit is in the first state and in a cutoff state when the state holding circuit is in the second state;

a temperature detector to detect abnormal heating and bring the state holding circuit into the second state; and a reset circuit to bring the state holding circuit into the first state; wherein the power source connecting circuit is disposed in the ground line.

16. The direct-current voltage supply circuit according to claim 15, wherein the temperature detector includes:

a first current source and a thermistor connected in series between a portion of the power line adjacent to the direct-current power source and the ground line;

a second current source and a reference resistor connected in series between the portion of the power line adjacent to the direct-current power source and the ground line; and a comparator to compare a voltage at a node between the first current source and the thermistor and a voltage at a node between the second current source and the reference resistor.

17. The direct-current voltage supply circuit according to claim 15, wherein the state holding circuit includes an SR latch circuit set to the second state in response to an output of the temperature detector, and reset to the first state in response to an output of the reset circuit.

18. A direct-current voltage supply circuit to be inserted between a direct-current power source and a load, the direct-current voltage supply circuit comprising:

a power line;

a ground line;

a state holding circuit capable of being in either a first state or a second state;

a power source connecting circuit disposed in both of the power line and the ground line, the power source connecting circuit to be in a connected state when the state holding circuit is in the first state and in a cutoff state when the state holding circuit is in the second state;

a temperature detector to detect abnormal heating and bring the state holding circuit into the second state; and a reset circuit to bring the state holding circuit into the first state.

* * * * *